(12) United States Patent
Mochizuki et al.

(10) Patent No.: US 8,204,398 B2
(45) Date of Patent: Jun. 19, 2012

(54) IMAGE FORMING APPARATUS WITH CONTROLLER FOR AUTOMATICALLY SWITCHING DISPLAYS OF OPERATION PROCEDURE IN ROTATION

(75) Inventors: Chigusa Mochizuki, Osaka (JP); Dai Shigenobu, Osaka (JP); Miki Teshima, Osaka (JP); Hiromi Sakata, Osaka (JP); Tetsuya Maeda, Osaka (JP)

(73) Assignee: Kyocera Mita Corporation (JP)

( * ) Notice: Subject to any disclaimer, the term of this patent is extended or adjusted under 35 U.S.C. 154(b) by 0 days.

(21) Appl. No.: 13/177,062

(22) Filed: Jul. 6, 2011

(65) Prior Publication Data

US 2011/0261411 A1    Oct. 27, 2011

Related U.S. Application Data

(62) Division of application No. 11/710,664, filed on Feb. 23, 2007, now Pat. No. 8,010,009.

(30) Foreign Application Priority Data

| | | |
|---|---|---|
| Feb. 24, 2006 | (JP) | 2006-049265 |
| Feb. 24, 2006 | (JP) | 2006-049266 |
| Feb. 24, 2006 | (JP) | 2006-049267 |
| Feb. 24, 2006 | (JP) | 2006-049350 |
| Feb. 24, 2006 | (JP) | 2006-049351 |

(51) Int. Cl.
*G03G 15/00* (2006.01)
(52) U.S. Cl. ........................................................ 399/81
(58) Field of Classification Search .................. 399/11, 399/18, 19, 21, 24, 31, 81; 345/473, 960; 715/705, 707
See application file for complete search history.

(56) References Cited

U.S. PATENT DOCUMENTS

| | | | |
|---|---|---|---|
| 4,682,158 | A | 7/1987 | Ito et al. |
| 5,602,625 | A | 2/1997 | Okamoto et al. |
| 6,314,249 | B1 | 11/2001 | Lay et al. |
| 6,744,998 | B2 | 6/2004 | McIntyre |
| 6,748,186 | B1 | 6/2004 | Skrainar et al. |
| 6,750,878 | B1 | 6/2004 | Tatsuo et al. |
| 2007/0201884 | A1 | 8/2007 | Yamada |

FOREIGN PATENT DOCUMENTS

| | | |
|---|---|---|
| JP | 2-158869 | 6/1990 |
| JP | 07-181839 | 7/1995 |
| JP | 9-185752 | 7/1997 |
| JP | 11-191822 | 7/1999 |
| JP | 11-231729 | 8/1999 |
| JP | 2000-085220 | 3/2000 |
| JP | 2000-89619 | 3/2000 |
| JP | 2000-155507 | 6/2000 |
| JP | 2001-199137 | 7/2001 |
| JP | 2002-258682 | 9/2002 |
| JP | 2003-5586 | 1/2003 |
| JP | 2004-110393 | 4/2004 |
| JP | 2005-3894 | 1/2005 |
| JP | 2005-157144 | 6/2005 |
| JP | 2005-208335 | 8/2005 |
| JP | 2005-316602 | 11/2005 |

*Primary Examiner* — Robert Beatty
(74) *Attorney, Agent, or Firm* — Gerald E. Hespos; Michael J. Porco

(57) ABSTRACT

An image forming apparatus is provided with a display device for displaying an operation guide to an operator, and a display controller for causing the display device to display an operation procedure comprised of a plurality of operations as the operation guide while automatically switching the respective operations in rotation.

2 Claims, 23 Drawing Sheets

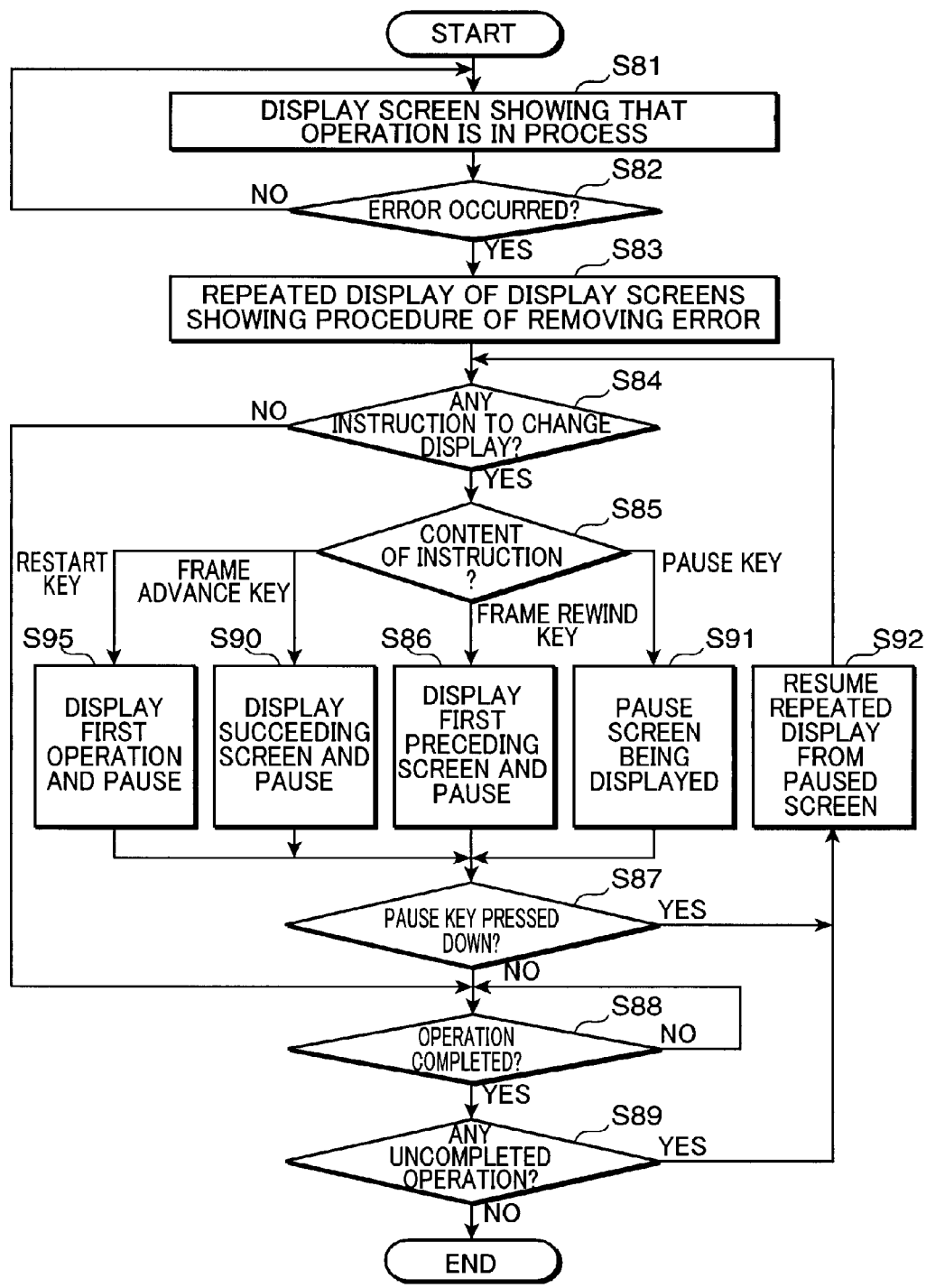

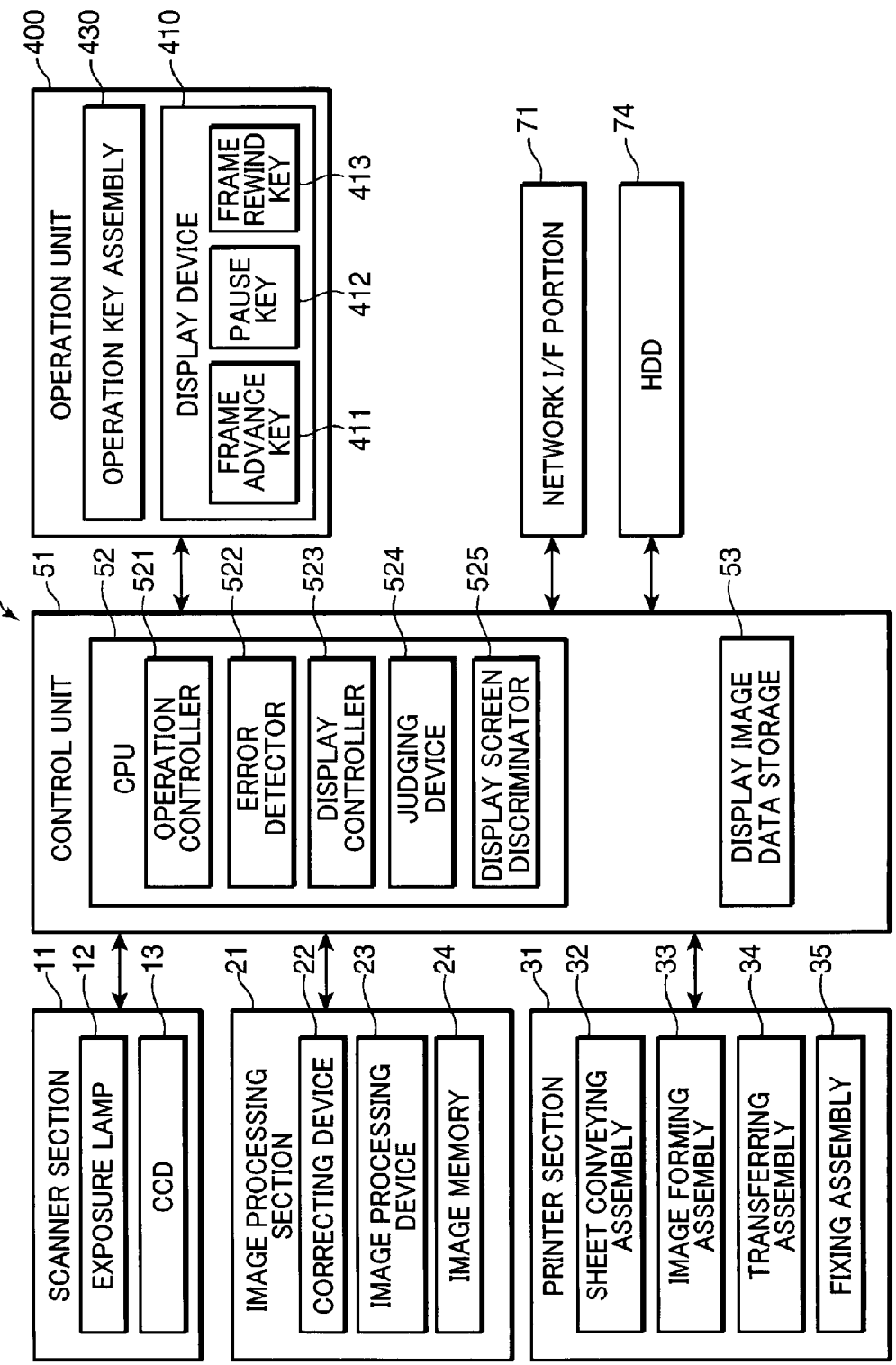

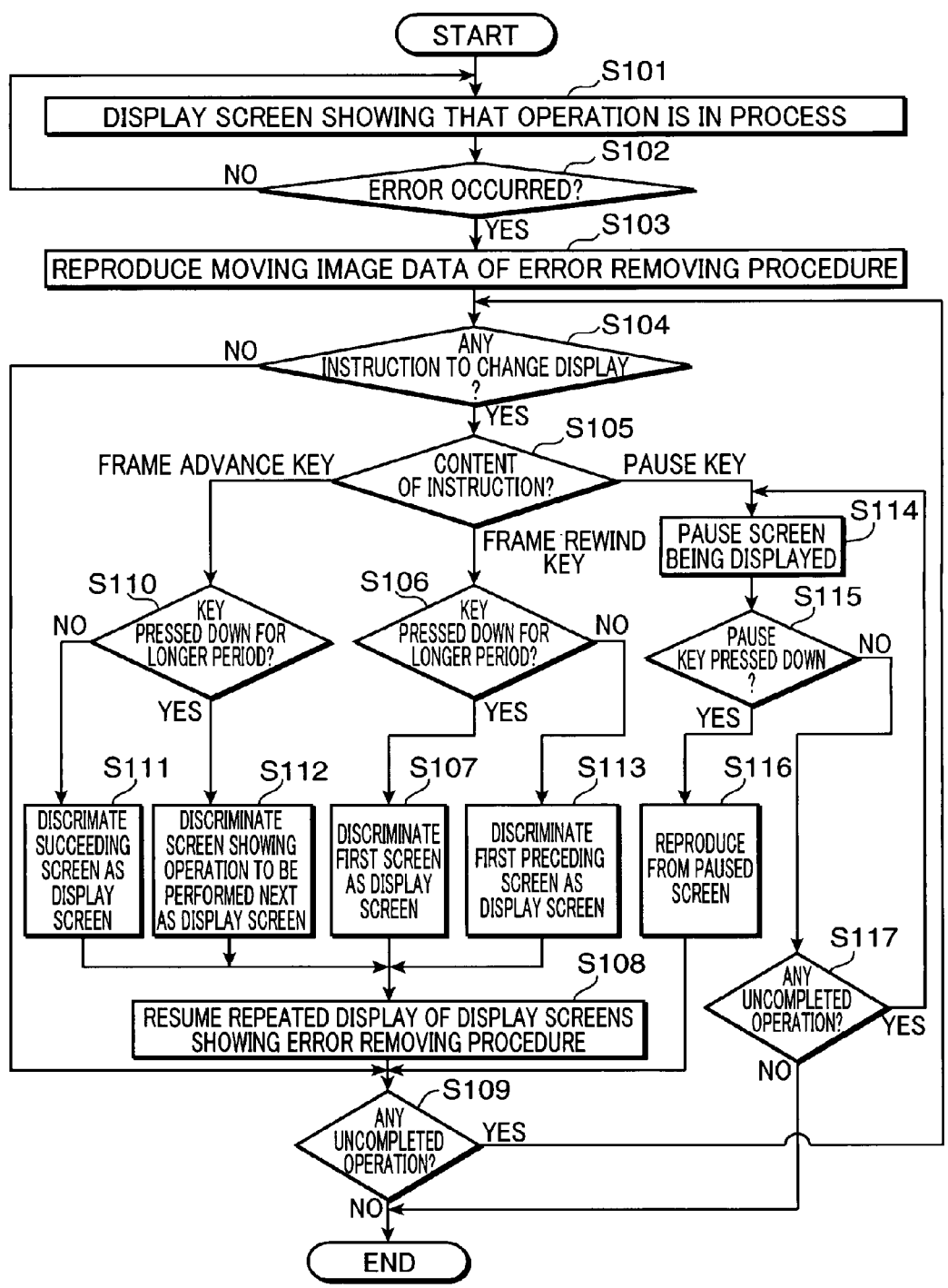

IMAGE FORMING APPARATUS WITH CONTROLLER FOR AUTOMATICALLY SWITCHING DISPLAYS OF OPERATION PROCEDURE IN ROTATION

CROSS-REFERENCE TO RELATED APPLICATIONS

This application is a divisional of U.S. patent application Ser. No. 11/710,664 filed on Feb. 23, 2007.

BACKGROUND OF THE INVENTION

1. Field of the Invention

The present invention relates to an image forming apparatus such as a copier, a facsimile machine or a composite apparatus.

2. Description of the Related Art

In an image forming apparatus such as a copier, a facsimile machine or a composite apparatus, it has been conventionally known to display a guide to the procedure for the removal of an error on a display device provided in an operation panel if an error such as a sheet jam has occurred (see, for example, Japanese Unexamined Patent Publication No. 2005-208335). In this image forming apparatus, an error occurring at the time can be removed if an operator carries out an operation in accordance with an error removing procedure displayed on the display device.

However, in the image forming apparatus disclosed in the above publication, operation display screens for guiding the error removing procedure cannot be switched unless the operator presses a frame advance key or a frame rewind key down, wherefore user-friendliness lacks.

SUMMARY OF THE INVENTION

In order to solve the aforementioned problem, an object of the present invention is to provide an image forming apparatus having good user-friendliness at the time of guiding an operator with an error removing procedure.

Specifically, the present invention is directed to an image forming apparatus, comprising display portion for displaying an operation guide to an operator; and display controller for causing the display portion to display an operation procedure comprised of a plurality of operations as the operation guide while automatically switching the respective operations in rotation.

According to the present invention, since the display controller causes the display portion to display the operation procedure comprised of the plurality of operations as the operation guide while automatically switching the respective operations in rotation, the operator can grasp the operation succeeding the one being displayed on the display portion without being forced to switch the display screen.

These and other objects, features, aspects and advantages of the present invention will become more apparent upon a reading of the following detailed description and accompanying drawings.

BRIEF DESCRIPTION OF THE DRAWINGS

FIG. 21 is a flow chart showing the eighth embodiment of the screen display switching control of the display device in the event of an operation error in the composite apparatus.

FIG. 22 is a control block diagram showing the composite apparatus carrying out a screen display switching control of a ninth embodiment.

FIG. 23 is a flow chart showing the ninth embodiment of the screen display switching control of the display device in the event of an operation error in the composite apparatus.

DETAILED DESCRIPTION OF THE PREFERRED EMBODIMENTS

Hereinafter, a composite apparatus as one embodiment of an image forming apparatus according to the present invention is described with reference to the accompanying drawings.

Figure 1:
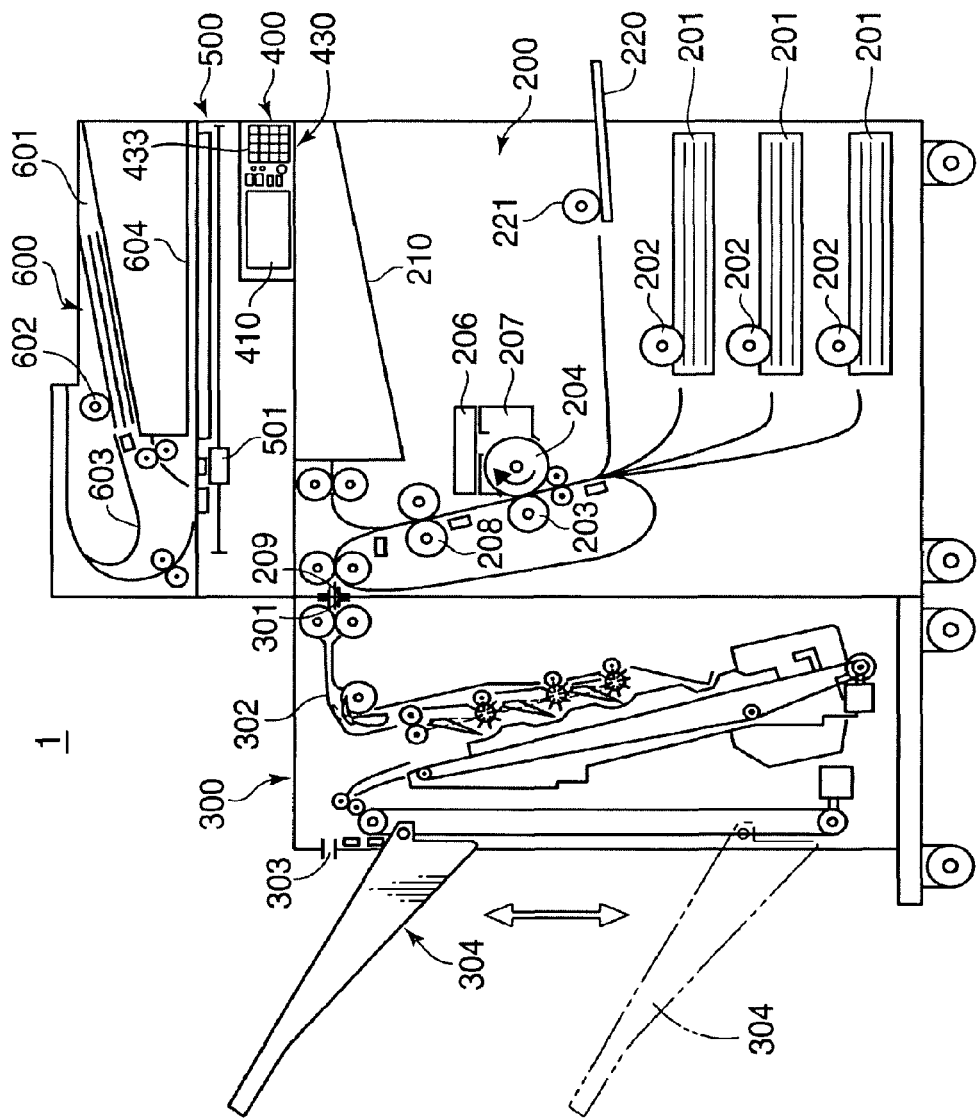
FIG. 1 is a schematic side view in section mainly showing the construction of a composite apparatus according to one embodiment of the invention.

FIG. 1 is a schematic side view in section mainly showing the construction of a composite apparatus according to one embodiment of the present invention. A composite apparatus 1 is comprised of a main unit 200, a sheet post-processing unit 300 arranged at a sheet discharge side, e.g. at the left side of the main unit 200, an operation unit 400 used by an operator to input various operation commands and the like, and a document reading unit 500 arranged atop the main unit 200, and a document feeding unit 600 arranged atop the document reading unit 500.

The operation unit 400 is provided with a display device 410 including an LCD (liquid crystal display) or the like, and an operation key assembly 430 used by the operator to input operation instructions. The operation key assembly 430 includes a start key, a numeric pad and the like.

The document feeding unit 600 is provided with a document placing portion 601, a feed roller 602, a document conveying portion 603 and a document discharging portion 604, whereas the document reading unit 500 is provided with a scanner 501. The feed roller 602 dispenses a specified number of documents set on the document placing portion 601 one by one, and the document conveying portion 603 successively conveys the dispensed documents to a reading position. The scanner 501 successively reads images of the documents being conveyed, and the documents having the images thereof read are discharged to the document discharging portion 604.

The main unit 200 is provided with a plurality of sheet cassettes 201, a plurality of feed rollers 202, a transfer roller 203, a photoconductive drum 204, an exposing device 206, a developing device 207, a fixing roller 208, a discharge opening 209, a discharge tray 210 and the like.

The photoconductive drum 204 is uniformly charged by a charging device (not shown) while being rotated in a direction of arrow. The exposing device 206 irradiates the photoconductive drum 204 with a laser beam modulated in accordance with a document image data read by the document reading unit 500 to form an electrostatic latent image of each color on the outer circumferential surface of the drum 204. The developing device 207 supplies black developing agent to the photoconductive drum 204 to form a toner image.

On the other hand, each feed roller 202 dispenses a print sheet from the corresponding sheet cassette 201 accommodating print sheets and feeds it to the transfer roller 203. The transfer roller 203 causes the toner image on the photoconductive drum 204 to be transferred to the print sheet conveyed thereto, and the fixing roller 208 heats the transferred toner image to fix it to the print sheet. Thereafter, the print sheet is brought into the sheet post-processing unit 300 through the discharge opening 209 of the main unit 200. Print sheets are also discharged onto the discharge tray 210 according to needs.

The sheet post-processing unit 300 is provided with a load port 301, a print-sheet conveying portion 302, an unload port 303, a stack tray 304 and the like. The print-sheet conveying portion 302 successively conveys the print sheets brought into the load opening 301 through the discharge opening 209 and finally discharges the print sheets to the stack tray 304 through the unload opening 303. The stack tray 304 is so constructed as to be vertically movable in directions of arrows according to the number of stacked print sheets discharged through the unload opening 303.

Figure 2:
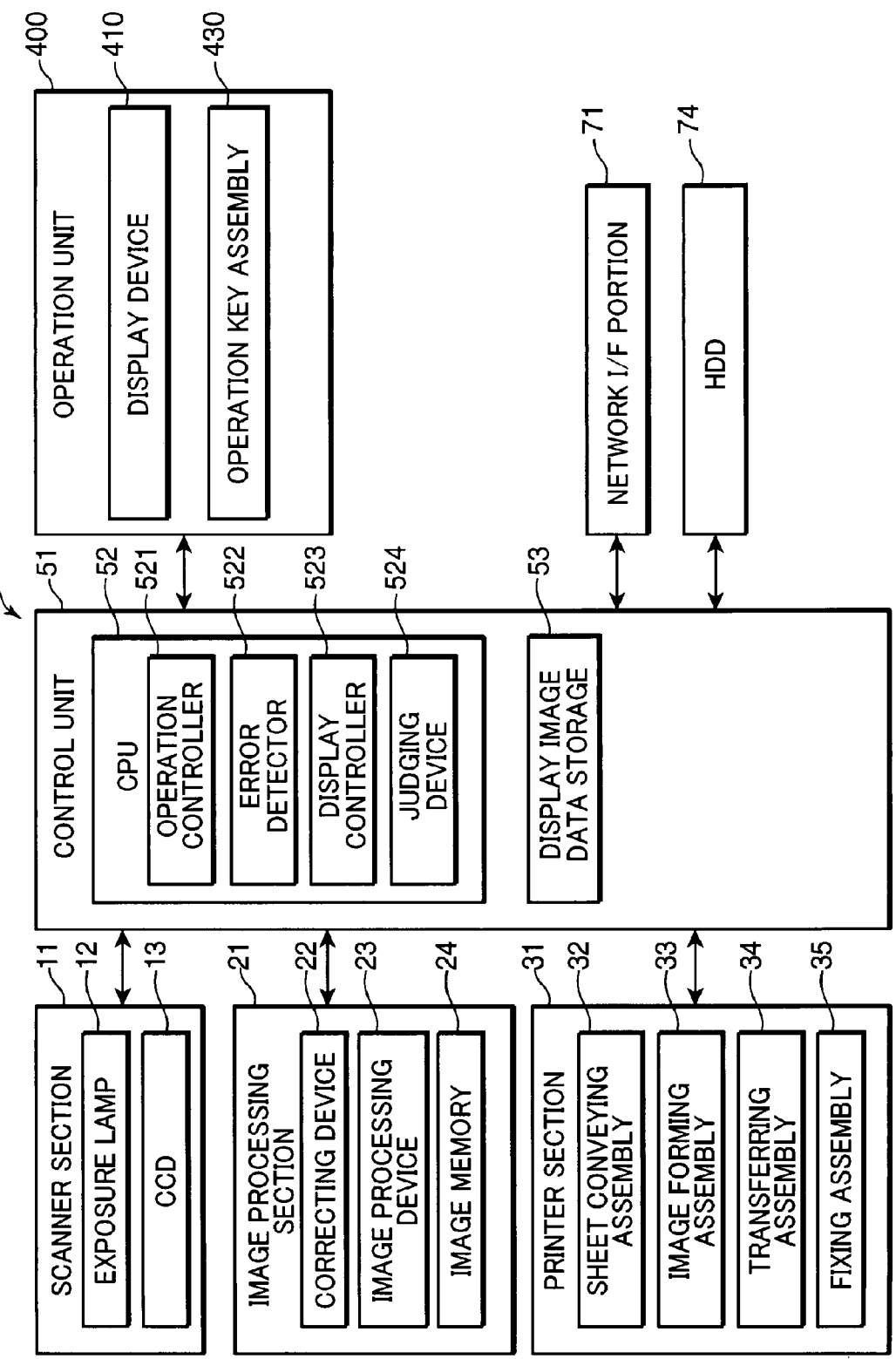
FIG. 2 is a control block diagram of the composite apparatus shown in FIG. 1.

FIG. 2 is a control block diagram of the composite apparatus shown in FIG. 1. The composite apparatus 1 is provided with a scanner section 11, an image processing section 21, a printer section 31, the operation unit 400, a control unit 51, a network I/F (interface) portion 71, and an HDD (hard disk drive) 74.

The scanner section 11 includes an exposure lamp 12 and CCDs (charge-coupled devices) 13 constituting the scanner 501 shown in FIG. 1. The scanner section 11 is such that a document is irradiated by the exposure lamp 12, a light reflected by the document is received by the CCDs 13 to thereby read an image from the document, and an image data corresponding to the read image is outputted to the image processing section 21.

The image processing section 21 includes a correcting device 22, an image processing device 23 and an image memory 24. The image processing section 21 processes the read image data by means of the correcting device 22 and the image processing device 23 according to needs and saves the processed image data in the image memory 24 or outputs it to the printer section 31. The correcting device 22 applies specified corrections such as a level correction and a γ-correction to the read image data. The image processing device 23 applies various processings such as compression or expansion and enlargement or size-reduction to the image data.

The printer section 31 includes a sheet conveying assembly 32 constructed by the sheet cassettes 201, the feed rollers 202 and the like shown in FIG. 1; an image forming assembly 33 constructed by the photoconductive drum 204, the exposing device 206, the developing device 207 and the like shown in FIG. 1; a transferring assembly 34 constructed by the transfer roller 203 and the like shown in FIG. 1; and a fixing assembly 35 constructed by the fixing roller 208 and the like shown in FIG. 1. The printer section 31 prints an image on a recording sheet using an image data read by the scanner section 11. Specifically, the sheet conveying assembly 32 conveys a recording sheet to the image forming assembly 33, the image forming assembly 33 forms a toner image corresponding to the above image data, the transferring assembly 34 transfers the toner image to the recording sheet, and the fixing assembly 35 fixes the toner image to the recording sheet to print the image.

The network I/F portion 71 controls various data transmission and reception to and from external apparatuses via a LAN using a network interface (10/100 Base-TX). The HDD 74 saves the image data read by the scanner section 11 and an output format set in the image data.

The operation unit 400 is provided with the display device 410, the operation key assembly 430 and the like shown in FIG. 1. The display device 410 is constructed by a touch panel unit obtained by combining a touch panel and an LCD or the like. The display device 410 displays various operation screens and enables the operator to input commands to execute various functions by touching a display surface (displayed operation keys). The operation key assembly 430 includes the start key, the numeric pad and the like as described above.

The control unit 51 includes a CPU 52 and a display image data storage 53. The CPU 52 governs the operation control of the composite apparatus 1. The display image data storage 53 stores various still image data and moving image data to be displayed on the display device 410.

The CPU 52 includes an operation controller 521, an error detector 522, a display controller 523 and a judging device 524. The operation controller 521 governs the operation control of the respect parts (scanner section 11, image processing section 21, printer section 31, etc.) of the composite apparatus 1. The error detector 522 detects operation errors of the respective parts during the operation of the composite apparatus 1. Operation errors include, for example, sheet jams in a sheet conveyance path from the sheet cassettes 201 to the discharge tray 210, the document conveying portion 603 of the document feeding unit 600 and the like, and abnormal stops caused by the breakdown of the image forming assembly 33, the transferring assembly 34, and the like.

The display controller 523 is for controlling the operation of the display device 410. The display controller 523 causes the display device 410 to display operation guiding screens for the operator. For example, the display controller 523 reads necessary moving image data from the display image data storage 53 and reproduces them or reads necessary still image data from the display image data storage 53 and displays screens showing an operation procedure of removing the operation error in an animated manner (e.g. by continuously displaying a plurality of still images at the same position for animated display) if the operation error has been detected by the error detector 522. The display controller 523 also causes the display device 410 to display a guide screen or the like used to receive the input of instructions on the respective functions such as a copy function and other screens.

The judging device 524 judges whether or not the operator has completed operations to remove the operation error in accordance with signals and the like from sensors provided in the respective parts of the composite apparatus 1.

Figure 3:
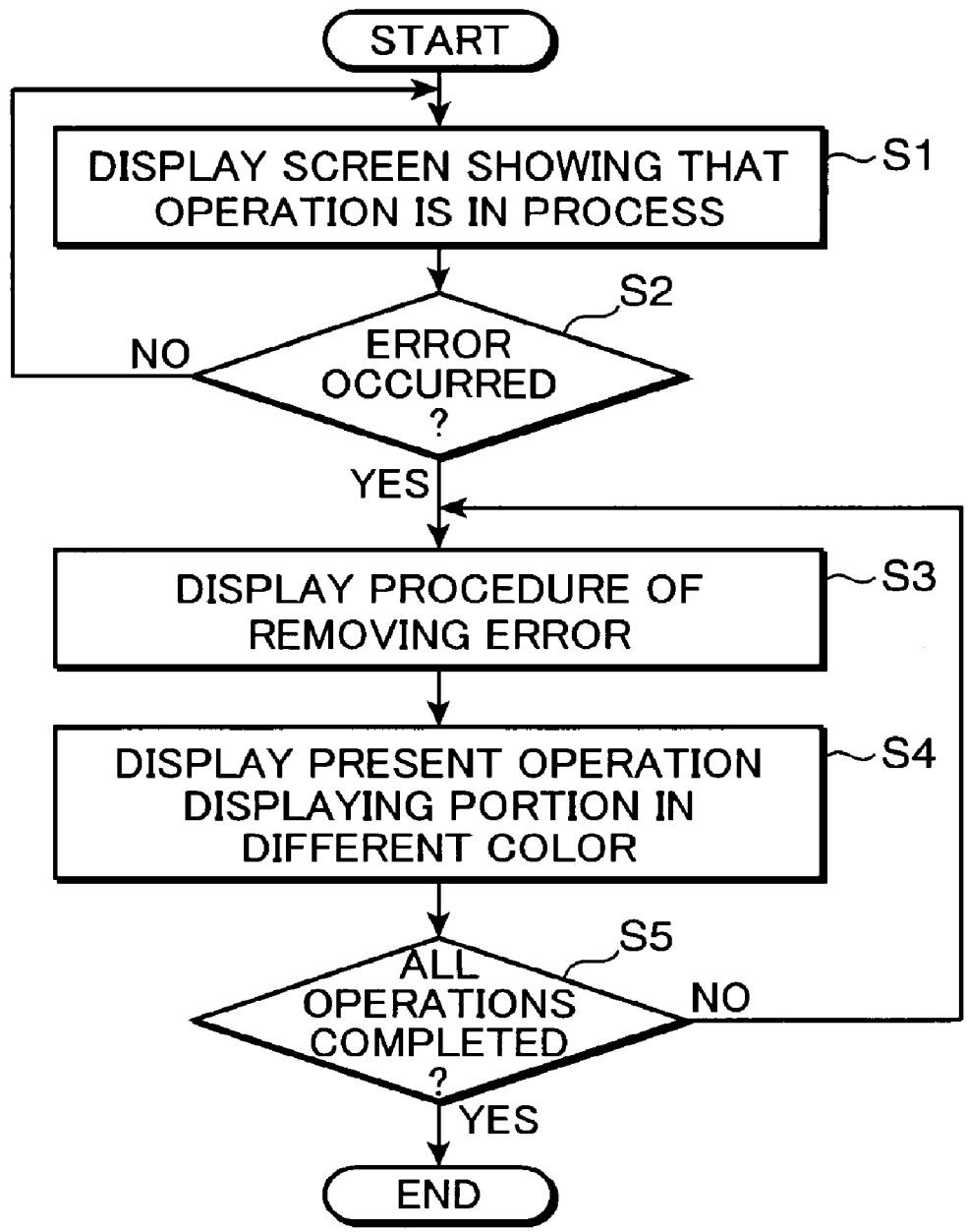
FIG. 3 is a flow chart showing a screen display switching control of a display device in the event of an operation error in the composite apparatus.

Next, a first embodiment of a screen display switching control of the display device 410 in the event of an operation error in the composite apparatus 1 is described. FIG. 3 is a flow chart showing the screen display switching control of the display device 410 in the event of an operation error in the composite apparatus 1, FIG. 4 is a diagram showing an example of a display screen showing that copying is in process, FIG. 5 is a diagram showing an example of a display screen in the event of an operation error caused by a sheet jam, and FIG. 6 is a transition diagram of display screens of the display device 410.

Figure 4:
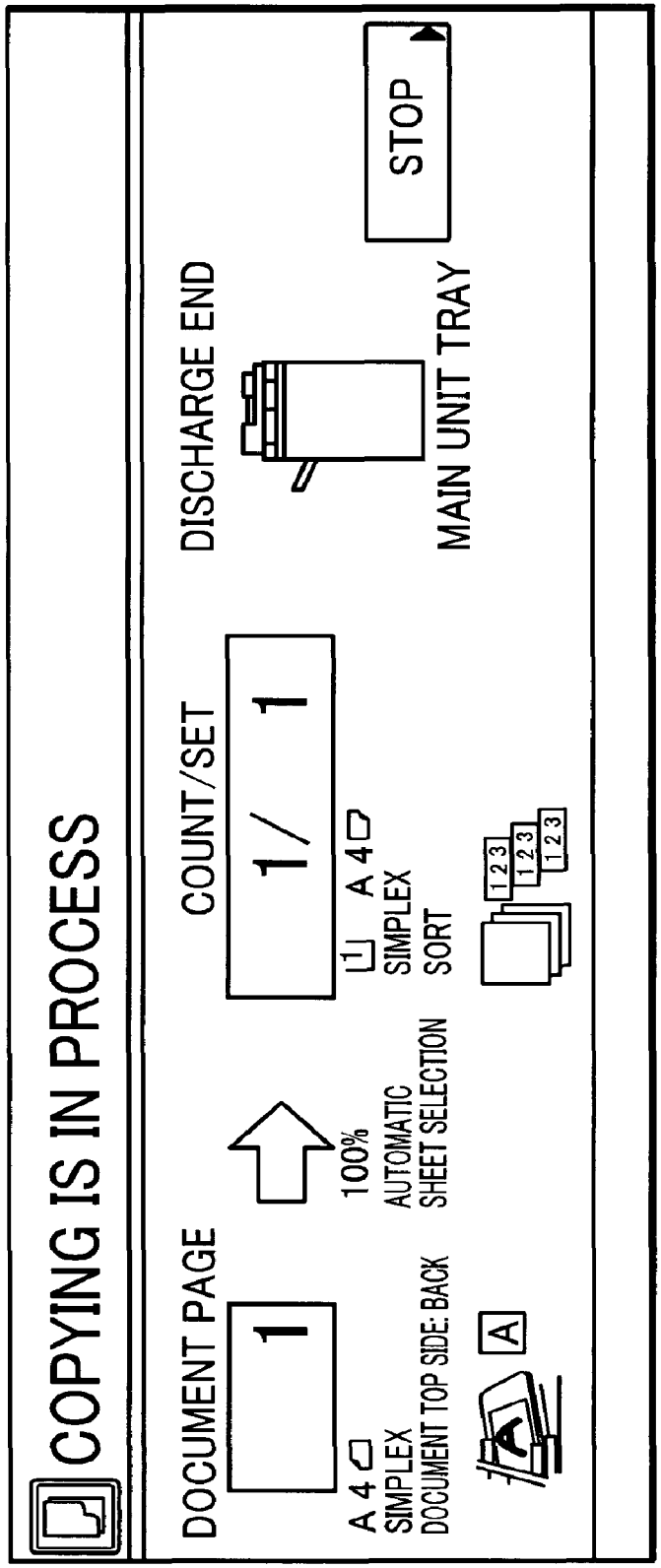
FIG. 4 is a diagram showing an example of a display screen showing that copying is in process.
Figure 5:
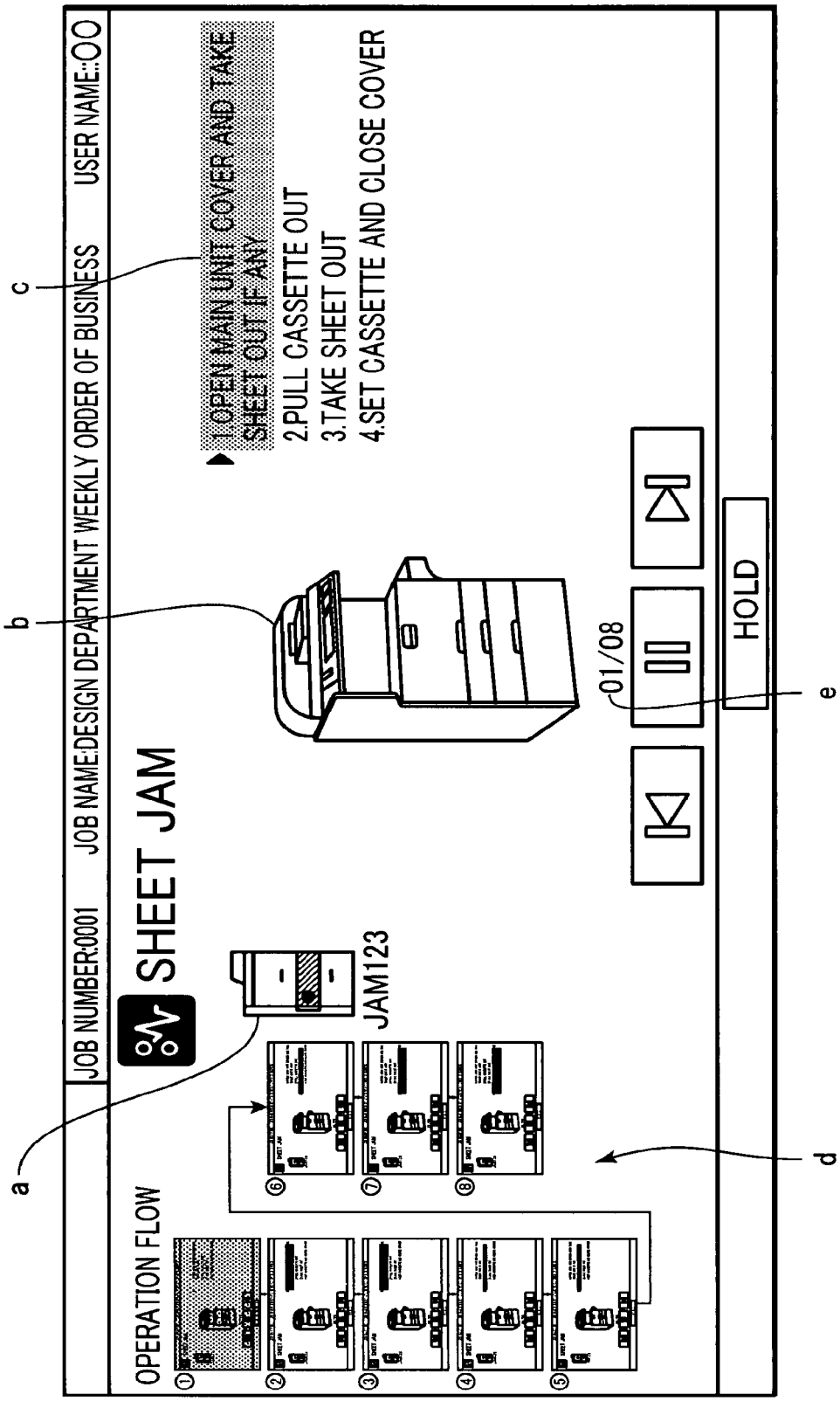
FIG. 5 is a diagram showing an example of a display screen in the event of an operation error caused by a sheet jam.

In the composite apparatus 1, if the operation controller 521 is causing the respective parts to perform operations in accordance with an operation instruction or the like from the operator inputted in the operation unit 400, e.g. if the operation controller 521 is causing the scanner section 11, the image processing section 21 and the printer section 31 to perform a copying operation, the display controller 523 causes the display device 410 to display a display screen showing that copying is in process as shown in FIG. 4 (Step S1). Hereinafter, description is given, taking the case of the copying operation as an example.

If the error detector 522 detects an operation error caused, for example, by a sheet jam during the copying operation (YES in Step S2), the display controller 523 reads data, which are used to display the operation procedure of removing the operation error caused by the sheet jam on the display device 410, from the display image data storage 53, reproduces the data and causes them to be displayed on the display device 410 (Step S3). This operation procedure is comprised of a plurality of operations, and the data used to display the operation procedure include data of display screens showing the plurality of operations.

Figure 6:
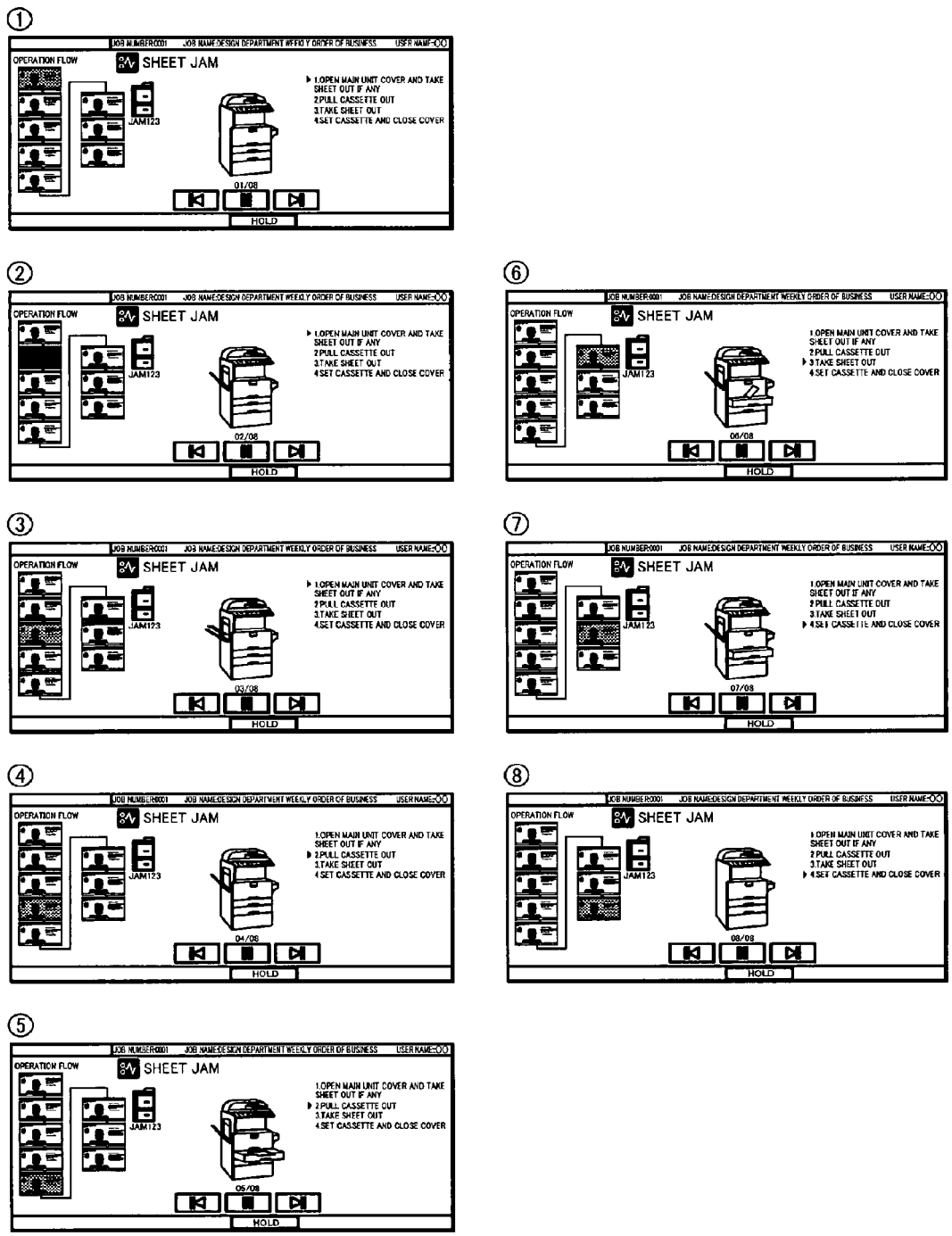
FIG. 6 is a transition diagram of display screens of the display device.

At this time, the display controller 523 causes screens showing a series of operations constituting the operation procedure of removing the operation error caused by the sheet jam to be switched in rotation and displayed on the display device 410 at intervals of specified periods, for example, as shown in (1) to (8) of FIG. 6. The display controller 523 causes parts of the composite apparatus 1 shown in the respective screens to be displayed in an animated manner to the operator as if the respective parts of the composite apparatus 1 were moving.

For example, the display controller 523 causes the animated display of a state where a main unit cover is opened as shown in (2) of FIG. 6 and the animated display of a state where a sheet is taken out from the cassette as shown in (5), (6) of FIG. 6, whereby the operator can visually and inspirationally grasp operations needed to be performed to remove the operation error. It should be noted that the display controller 523 repeats the displays from the one shown in (1) of FIG. 6 upon finishing the display shown in (8) of FIG. 6. Thus, the operator can easily grasp the operations necessary to remove the sheet jam from the beginning to the end by seeing the display screens of the display device 410.

Here, the screen of (1) in FIG. 6 to be first shown by the display controller 523 is described in detail. As shown in FIG. 5, a sheet jam occurring position ("a" in FIG. 5), the display controller 523 causes the display device 410 to display the external appearance of the composite apparatus 1 at the present moment ("b" in FIG. 5) and the character explanation of a series of operations to be performed by the operator ("c" in FIG. 5). A part of the character explanation on the operations representing an operation to be performed by the operator at this moment is displayed by the display controller 523 in a format different from the other parts, for example, by shading. Further, the display controller 523 causes all the operations constituting the operation procedure necessary to remove the operation error caused by the sheet jam to be displayed on the display screen ("d" in FIG. 5).

The display controller 523 causes the total number of the operations of the operation procedure for the removal of the operation error caused by the sheet jam and the order of the presently displayed operation in all the operations to be displayed on the respective screens. For example, if the total number of the operations of the operation procedure for the removal of the operation error caused by the sheet jam is eight as in this embodiment and the presently displayed operation is the first operation, the display controller 523 causes "01/08" to be displayed as shown in "e" of FIG. 5. By the presence of this display, the operator can easily recognize that there are eight operations to be performed for the removal of the sheet jam and the first operation is presently displayed on the screen by seeing the display screen of the display device 410. The display format of the total number of the operations of the operation procedure for the removal of the operation error caused by the sheet jam and the order of the presently displayed operation in all the operations is not limited to a numerical display like "01/08" and may be another display format. For example, the total number of the operations of the operation procedure and the order of the presently displayed operation in all the operations may be graphically displayed, for example, by means of images.

The display controller 523 causes a part of the displays of all the operations ("d" in FIG. 5) corresponding to the screen displayed on the display device 410 to be displayed differently from the preceding and succeeding operations (Step S4) while causing the display device 410 to display the respective screens of (1) to (8) in FIG. 6. For example, the display controller 523 causes the first one of the displays of all the operations to be highlighted (may be displayed by shading or in a different color and the display format for causing the display to differ from the other ones is not limited) when the first screen is displayed as shown in (1) of FIG. 6. In this way, the first display is made to stand out more than the other seven displays.

The display controller 523 performs the above display color changing process, for example, (1) by preparing two kinds of graphics showing screens of the same content and having different colors and displaying the corresponding screen as the operation is completed (display image data of different colors are stored in the display image data storage 53), or (2) by rewriting a code for administering the color of the screen and displaying the screen as the operation is completed (display controller 523 processes and reproduces data read from the display image data storage 53).

The display controller 523 continues to cause the display device 410 to perform Steps S3 and S4 until the judging device 524 judges that all the operations constituting the operation procedure have been completed by the operator (NO in Step S5). If the judging device 524 judges that all the operations constituting the operation procedure have been completed by the operator (YES in Step S5), the display controller 523 ends the above display process on the display device 410.

By the display control as above, the operator can accurately grasp which ones of the plurality of operations constituting the operation procedure to remove the operation error have been completed, which operation is presently performed and how many operations have to be performed to complete all the operations by looking at the parts "d" and "e" of FIG. 5 and the like on the display screen of the display device 410. In a conventional composite apparatus, an operation guide for the removal of the operation error is displayed on a display device for an operator, but the respective operation guides are separately displayed on one screen even when a plurality of operations have to be performed. Thus, it has been difficult for the operator to grasp the progress of the operations for the removal of the operation error. However, according to this embodiment, such a problem residing in the conventional composite apparatus can be solved.

Figure 7:
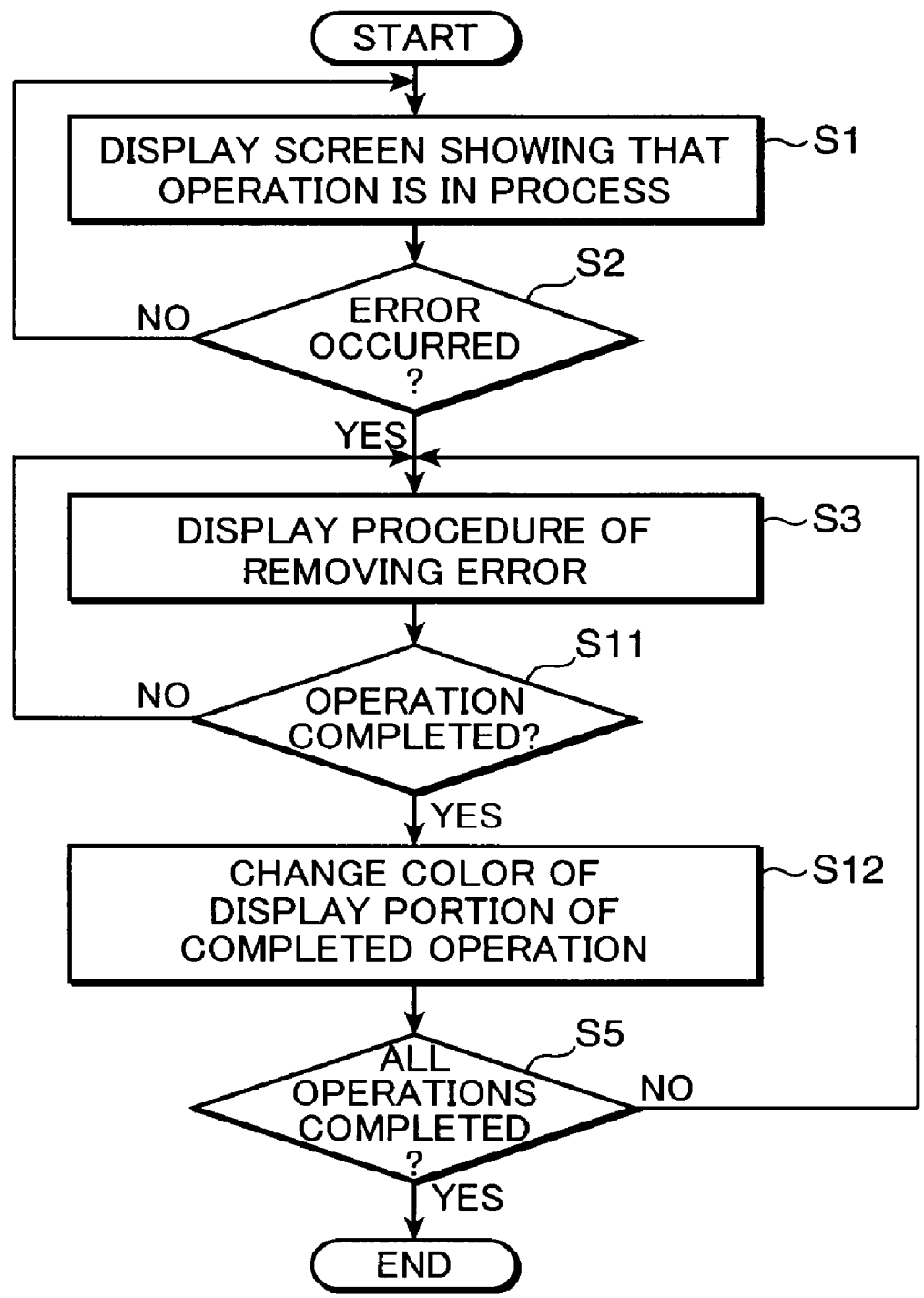
FIG. 7 is a flow chart showing a second embodiment of the screen display switching control of the display device in the event of an operation error in the composite apparatus.
Figure 8:
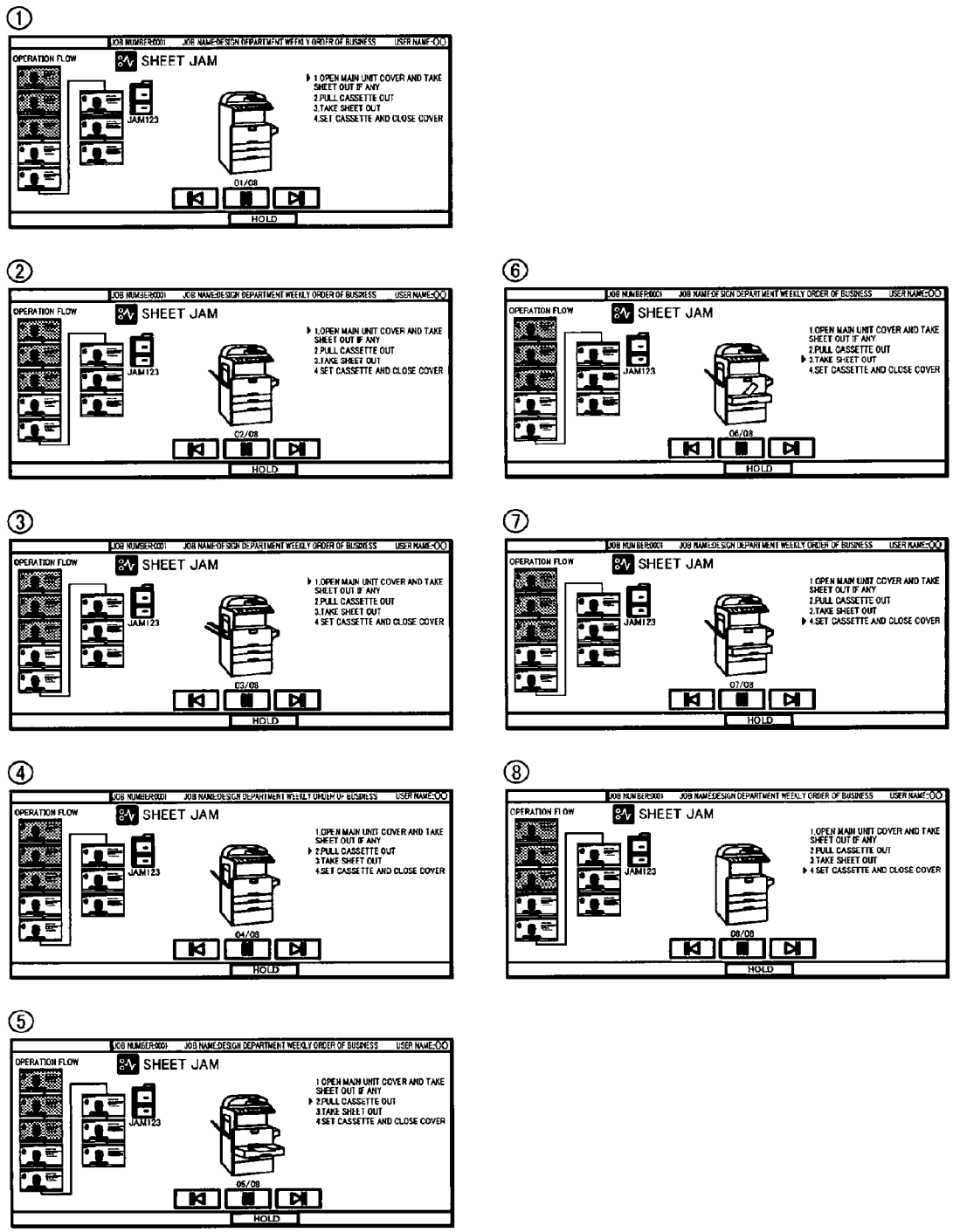
FIG. 8 is a transition diagram of display screens of the display device.

Next, a second embodiment of the screen display switching control of the display device 410 in the event of an operation error in the composite apparatus 1 is described. FIG. 7 is a flow chart showing the second embodiment of the screen display switching control of the display device 410 in the event of an operation error in the composite apparatus, and FIG. 8 is a transition diagram of display screens of the display device 410. It should be noted that operations similar to those shown in FIG. 3 are identified by the same reference numerals and are not described.

In the first embodiment shown in FIG. 3, the part of the display of all the operations (see "d" in FIG. 5) corresponding to the screen displayed on the display device 410 is displayed differently from the displays of the preceding and succeeding operations when the respective screens of (1) to (8) of FIG. 6 are displayed on the display device 410 (Step S4 of FIG. 3). However, in the second embodiment, the display controller 523 obtains information as to whether or not the respective operations of the operation procedure have been completed from the judging device 524 (Step S11), and causes parts of the display of all the operations (see "d" in FIG. 5) corresponding to the screens showing the operations judged to have been completed by the judging device 524 to be displayed in a color different from the other operation(s) (Step S12).

For example, when the judging device 524 judges that the operator opened the main unit cover to take a sheet out in accordance with a guide "1. OPEN MAIN UNIT COVER AND TAKE SHEET OUT IF ANY" displayed on the display device 410 (YES in Step S11), the display controller 523 causes the first to third displayed portions showing the operations already completed by the operator out of the display of all the operations ("d" in FIG. 5) to be shown in a color different from the fourth to eighth displays showing the other operations regardless of which screen is being displayed on the display device 410 as shown in (1) to (8) of FIG. 8. Thus, the operator can recognize that the operations displayed in the different color have been already completed by seeing the display screen of the display device 410, wherefore the operations already completed and those yet to be completed can be clearly distinguished. Further, the operator can easily grasp the progress of the operations (which operations have been completed out of a series of operations necessary to remove the operation error).

Figure 9:
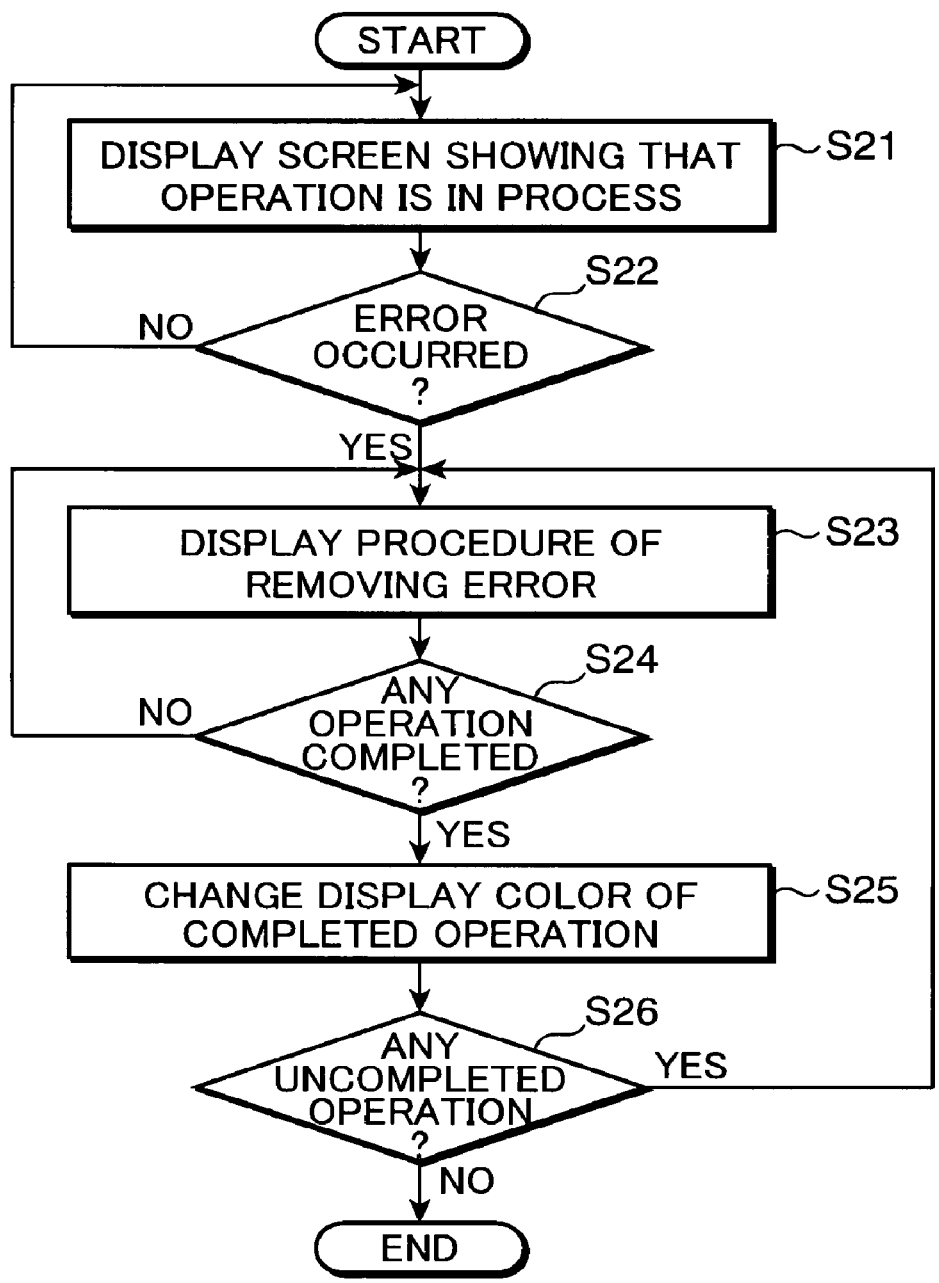
FIG. 9 is a flow chart showing a third embodiment of the screen display switching control of the display device in the event of an operation error in the composite apparatus.
Figure 10:
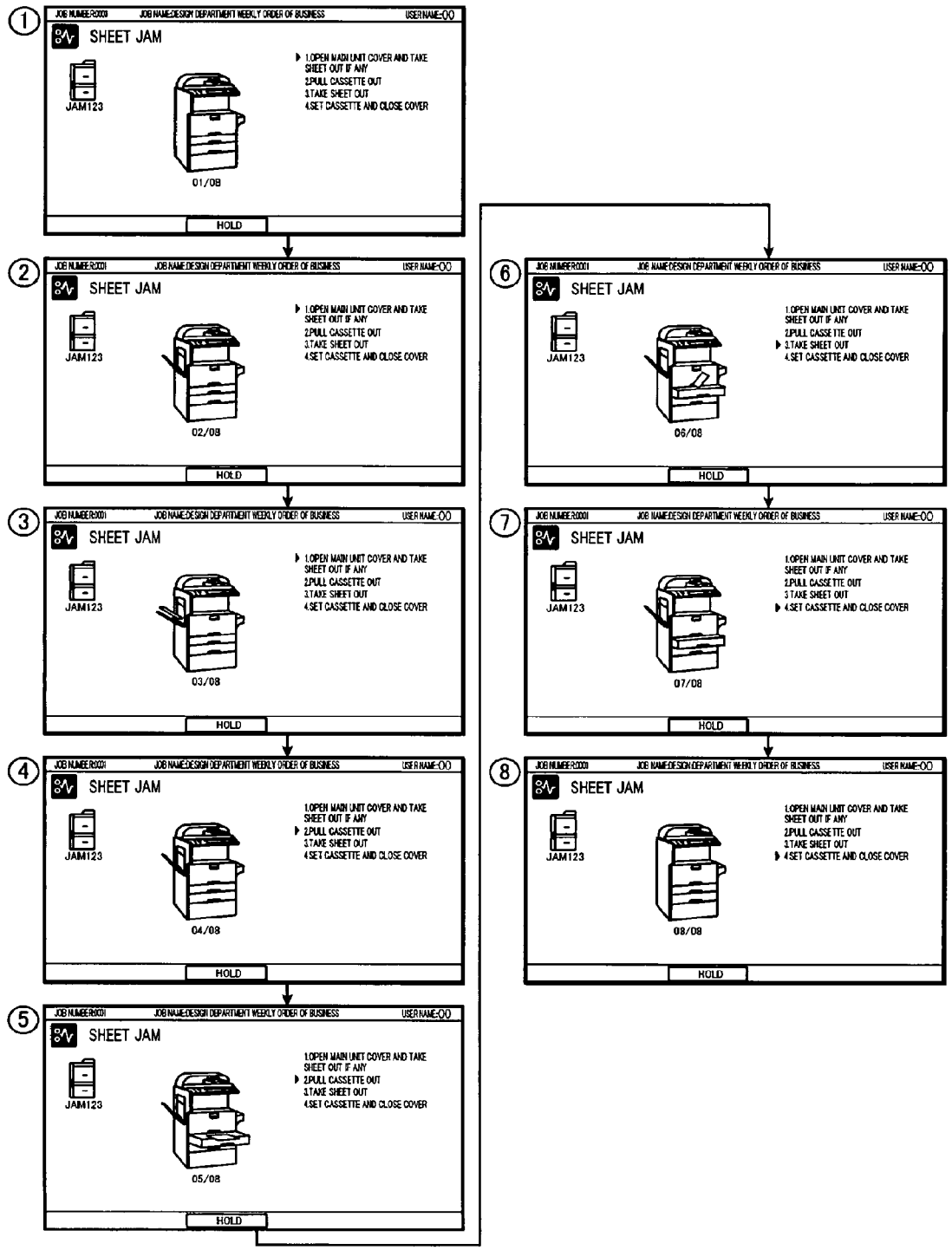
FIG. 10 is a diagram showing the transition of display screens showing an operation procedure in the event of an operation error caused by a sheet jam.
Figure 11:
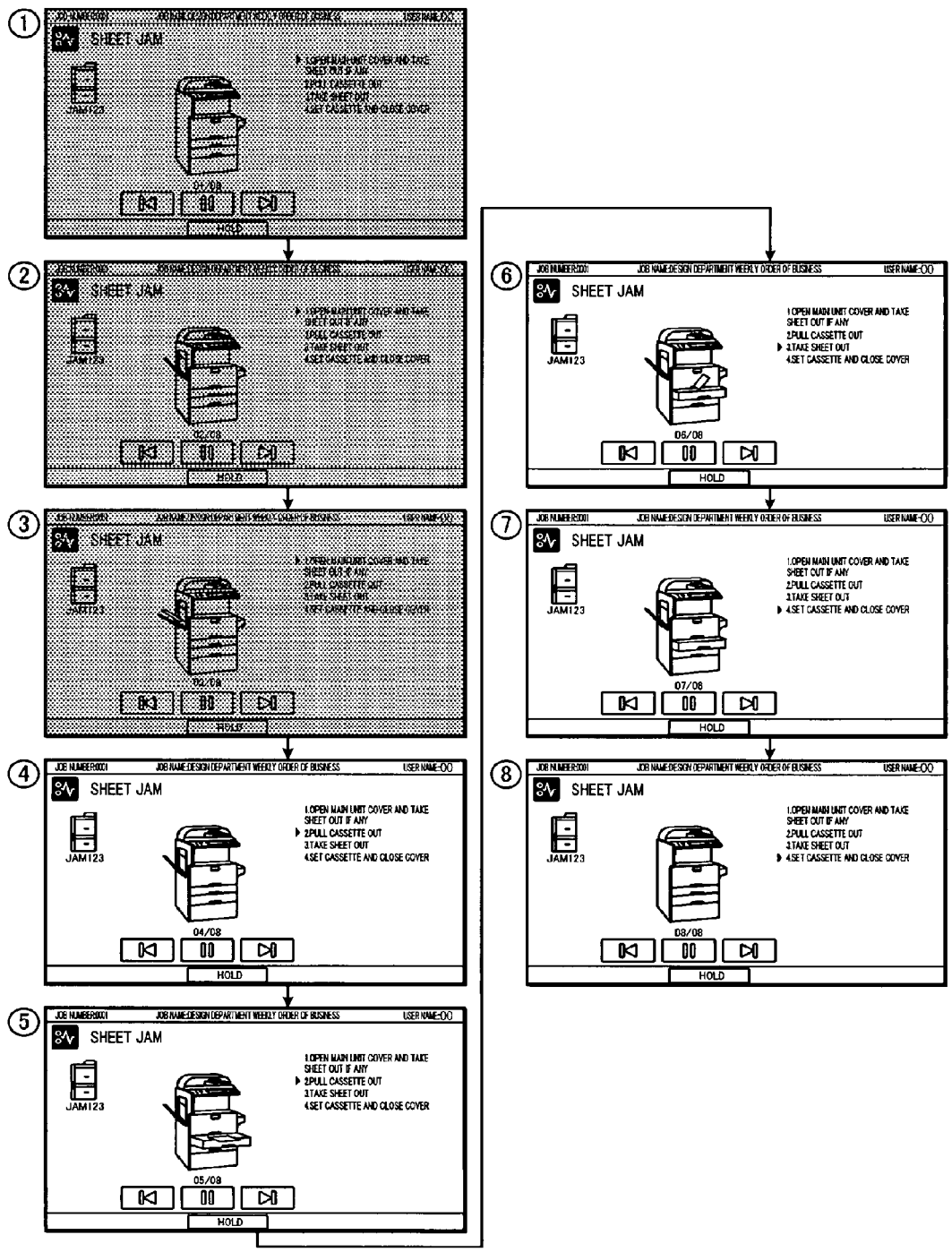
FIG. 11 is a diagram showing the transition of display screens showing an operation procedure in the event of an operation error caused by a sheet jam, wherein already completed operations are displayed in a different color.

Next, a third embodiment of the screen display switching control of the display device 410 in the event of an operation error in the composite apparatus 1 is described. FIG. 9 is a flow chart showing the third embodiment of the screen display switching control of the display device 410 in the event of an operation error, FIG. 10 is a diagram showing the transition of display screens showing an operation procedure in the event of an operation error caused by a sheet jam, and FIG. 11 is a diagram showing the transition of the display screens showing the operation procedure in the event of the operation error caused by the sheet jam, wherein the display of the operations already completed is changed in color. It should be noted that operations similar to those of the first or second embodiment are not described.

If the judging device 524 judges that one of a plurality of operations constituting the operation procedure has been completed by the operator (YES in Step S24) while the display controller 523 is causing the display device 410 to display the respective screens showing the operation procedure in the event of an error in Step S23, the display controller 523 changes the color of the display screen showing the operation completed by the operator (Step S25). For example, the display controller 523 changes the display color of the screen showing the already completed operation to sepia or the like and causes the display device 410 to display the screen. At this time, the display screens (1) to (8) are repeatedly displayed in rotation by the display controller 523 as shown in FIG. 10. After the color of the display screens (1) to (3) showing the operations already completed by the operator is changed to the one different from the display screens (4) to (8) showing the other operations, the display screens (1) to (8) are repeatedly displayed in rotation as shown in FIG. 11. Thus, the operator can recognize that the operations displayed in the different color have been already completed by seeing the display screen of the display device 410, wherefore the operations already completed and those yet to be completed can be clearly distinguished. Further, the operator can easily grasp the progress of the operations (which operations have been completed out of a series of operations necessary to remove the operation error).

The process of changing the display color of the screen by the display controller 523 is performed, for example, (1) by preparing two kinds of graphics showing screens of the same contents and having different colors and displaying the corresponding screen as the operation is completed (display image data of different colors are stored in the display image data storage 53) or (2) by rewriting a code for administering the color of the screen and displaying the screen as the operation is completed (display controller 523 processes and reproduces data read from the display image data storage 53).

The display controller 523 repeats the operations in Steps S23 to S25 (Step S26) until the judging device 524 judges that all the operations necessary to remove the operation error caused by the sheet jam have been completed. For example, when the judging device 524 judges that the operator opened the main unit cover to take a sheet out in accordance with a guide "1. OPEN MAIN UNIT COVER AND TAKE SHEET OUT IF ANY" (see FIG. 10) displayed on the display device 410, the display controller 523 first causes the display screens (1) to (3) to be displayed in sepia different from the display screens showing the other operations as shown in FIG. 11. Further, when the judging device 524 judges that the operator completed an operation of pulling the cassette out to take a sheet out in accordance with guides "2. PULL CASSETTE OUT" and "3. TAKE SHEET OUT," the display controller 523 causes the display device 410 to display the display screens (4) to (6) also in sepia, which is a color different from that of the remaining display screens (7), (8).

Steps S23 to S25 are continued until the judging device 524 judges that the operator has completed all the operations constituting the operation procedure (YES in Step S26). If the judging device 524 judges that the operator has completed all the operations constituting the operation procedure (NO in Step S26), the display controller 523 ends the process. In other words, the display controller 523 ends the animated display of the operation procedure on the display device 410.

Figure 12:
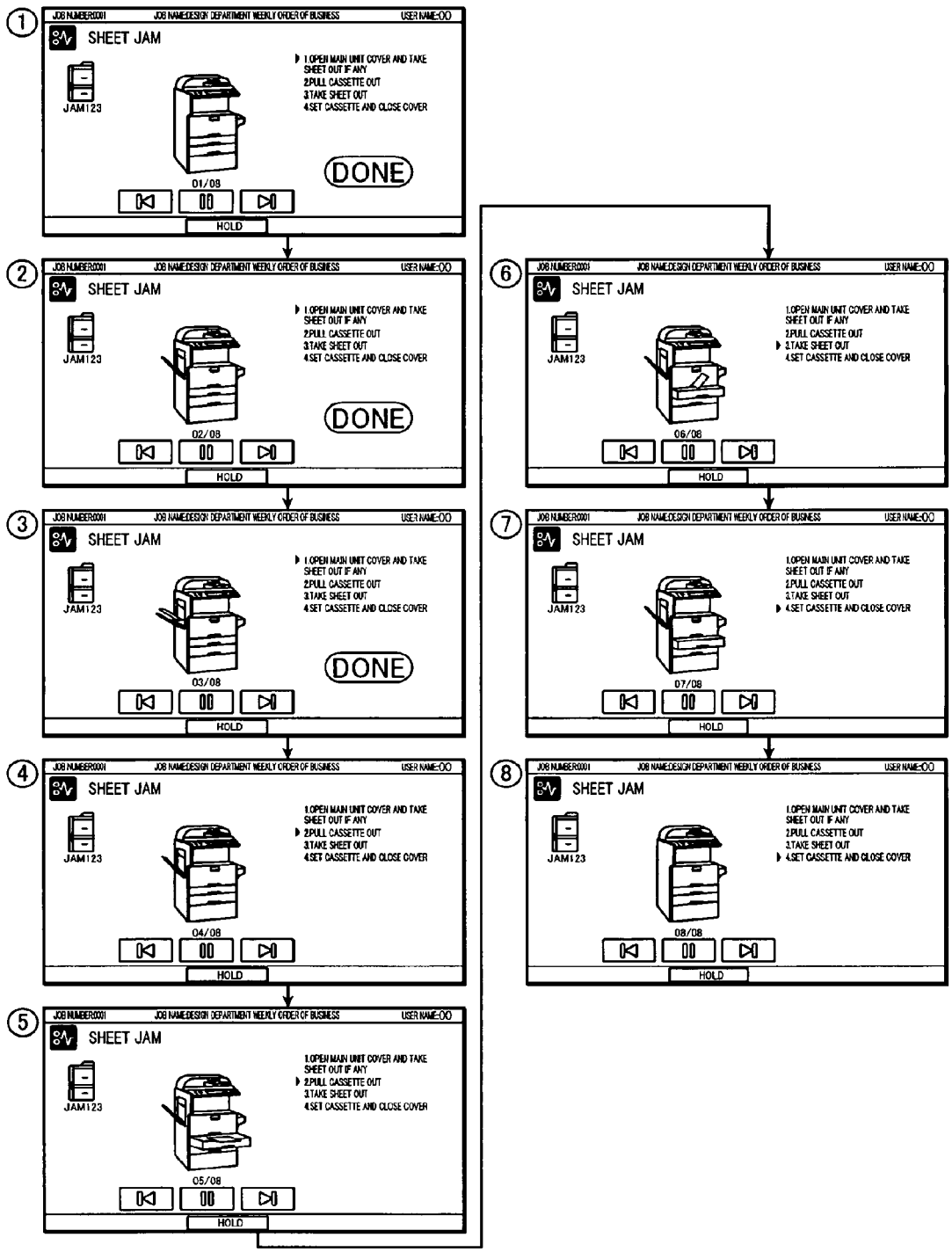
FIG. 12 is a diagram showing the transition of display screens showing an operation procedure in the event of an operation error caused by a sheet jam, wherein already completed operations are displayed in another display mode.

Although the display controller 523 causes the display device 410 to display the display screens showing the operations completed by the operator in the color (e.g. sepia) different from the one of the display screens showing the operations yet to be completed in this embodiment, the present invention is not limited thereto. Any other mode can be adopted provided that the display format of the operations already completed by the operator is different from that of the other operations. FIG. 12 is a diagram showing the transition of the display screens of the operation procedure in the event of an operation error caused by a sheet jam, wherein already completed operations are displayed in a different format. For example, the display controller 523 may superimpose an image of "DONE" on the display screens showing the operations already completed by the operator as shown in FIG. 12 so that these display screens have a display format different from those showing the operations yet to be completed. This process of changing the screen display by the display controller 523 is similar to the above process of changing the screen display color by the display controller 523.

Figure 13:
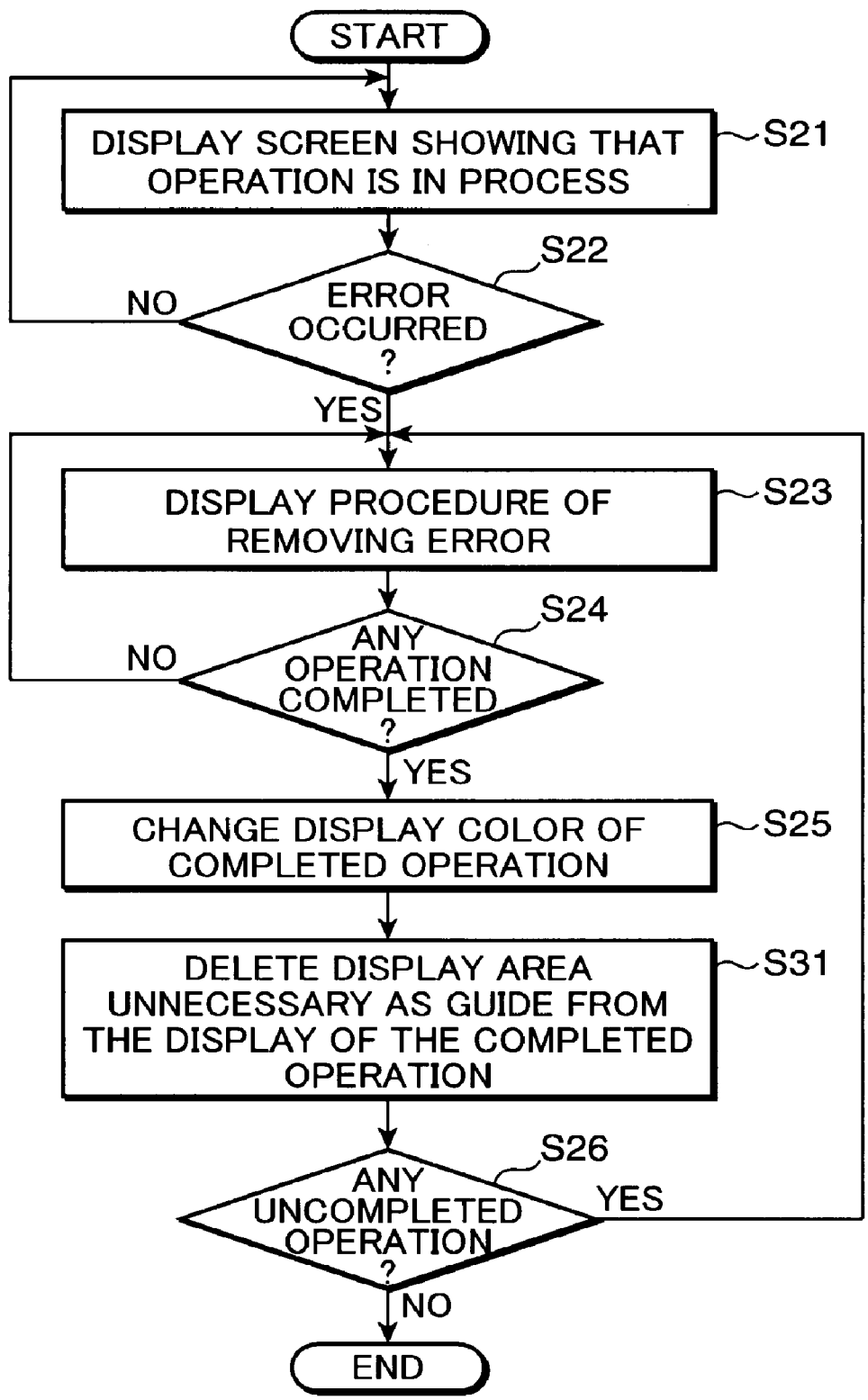
FIG. 13 is a flow chart showing a fourth embodiment of the screen display switching control of the display device in the event of an operation error in the composite apparatus.
Figure 14:
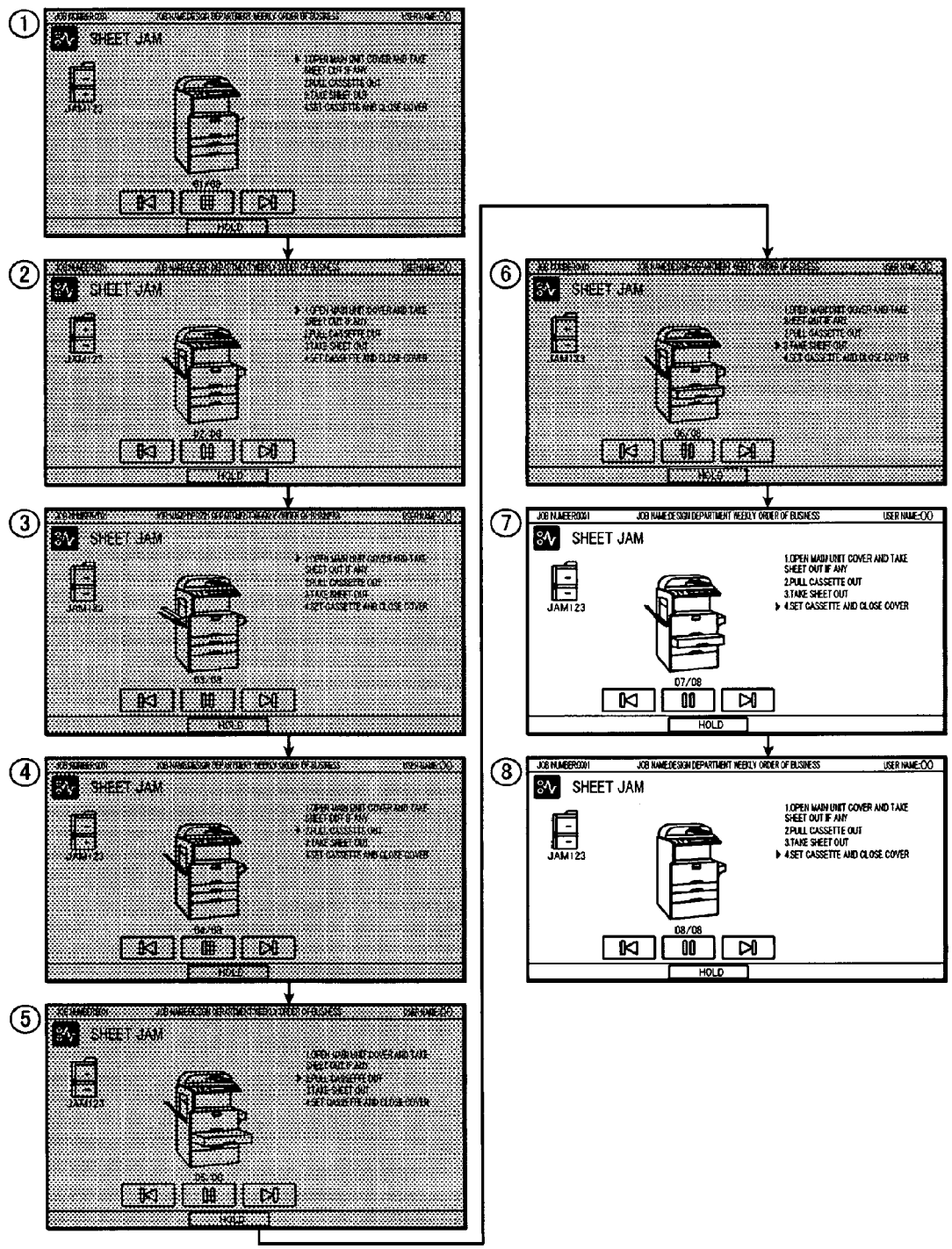
FIG. 14 is a diagram showing the transition of display screens showing an operation procedure in the event of an operation error caused by a sheet jam, wherein already completed operations are displayed in a different display mode.

Next, a fourth embodiment of the screen display switching control of the display device 410 in the event of an operation error in the composite apparatus 1 is described. FIG. 13 is a flow chart showing the fourth embodiment of the screen display switching control of the display device 410 in the event of an operation error, and FIG. 14 is a diagram showing the transition of display screens showing an operation procedure in the event of an operation error caused by a sheet jam, wherein operations already completed are displayed in a different format. It should be noted that operations in FIG. 13 similar to those of the third embodiment shown in FIG. 9 are identified by the same reference numerals and not described.

In the screen display switching control of the third embodiment shown in FIG. 9, the color of the display screens showing the operations already completed by the operator is changed. In addition, the display controller 523 may cause the display device 410 to display the display screens showing the operations already completed by the operator after deleting the displays that became unnecessary to guide the operator (Step S31).

In this case, the display controller 523 causes the display device 410 to display the display screens (1) to (6) in a color (e.g. sepia) different from that of the remaining display screens (7), (8) (Step S25) and an animated display showing a state where a sheet is taken out from the cassette is deleted (the animated display showing the state where a sheet is taken out from the cassette is not made) particularly in the display screens (5), (6) as shown in FIG. 14, for example, if the judging device 524 judges that the operator has completed an operation of pulling the cassette out and taking a sheet out in accordance with guides "2. PULL CASSETTE OUT." and "3. TAKE SHEET OUT". The operator already completed the operation of taking the sheet out from the cassette and it is not necessary to give the operation guide to the operator by this display at this point of time. Thus, the display content is simplified by not displaying the unnecessary operation guide, whereby the operator can more easily grasp operations still needed to be performed.

The process of changing the screen display by the display controller 523 is performed, for example, (1) by preparing graphics for screen displays corresponding to the display contents and the respective graphics are used depending on whether or not the operation has been completed or (2) by rewriting a code for administering the color of the screen and the display content and displaying the screen as the operation has been completed.

Figure 15:
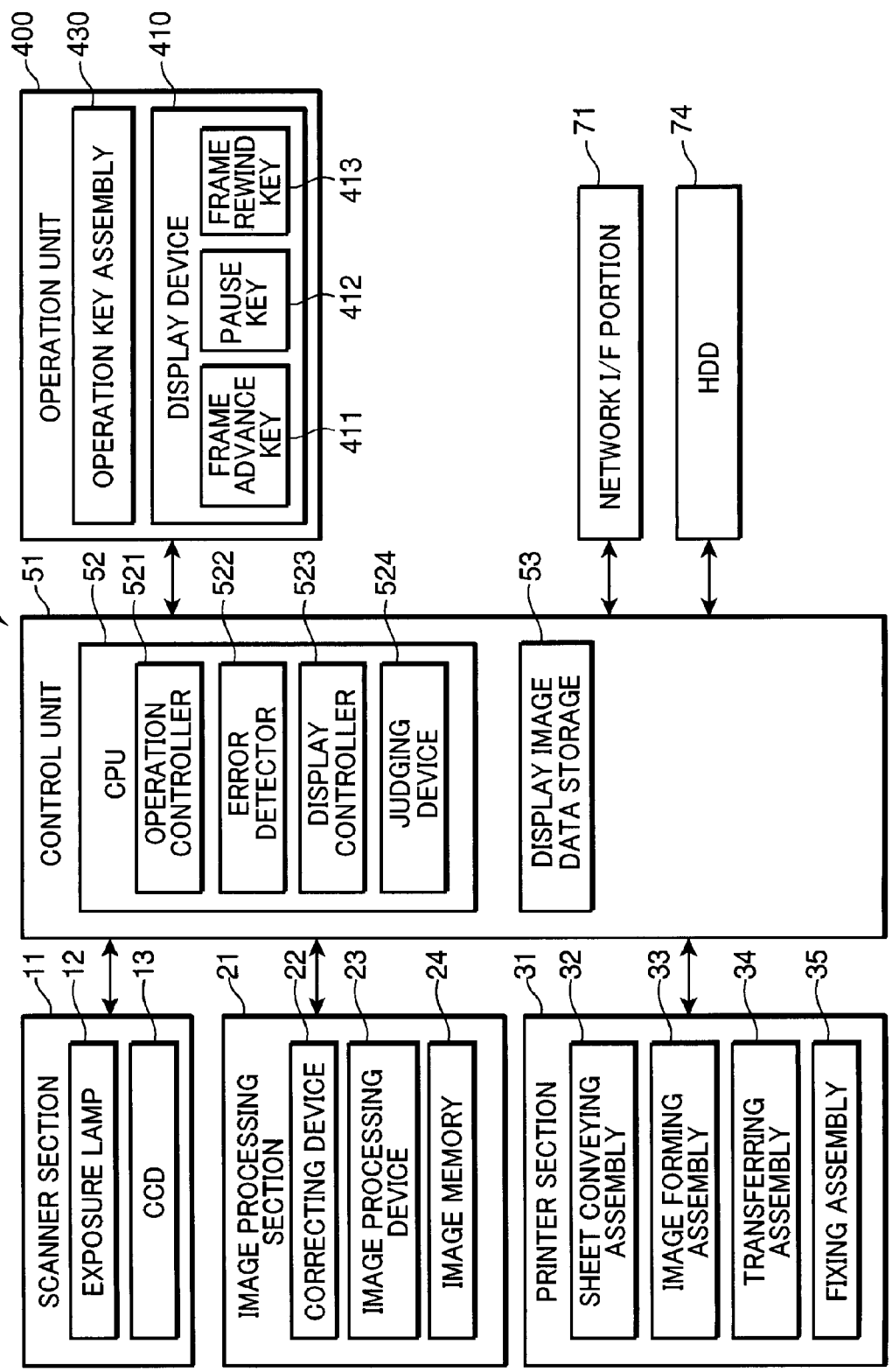
FIG. 15 is a control block diagram of the composite apparatus carrying out screen display switching controls of fifth to eighth embodiments.

Next, fifth to eighth embodiments of the screen display switching control of a display device 410 in the event of an operation error in a composite apparatus 1 are described. FIG. 15 is a control block diagram of a composite apparatus 1 executing the screen display switching controls of the fifth to eighth embodiments. It should be noted that the same construction as in the composite apparatus 1 shown in FIG. 2 are not described.

A display device 410 of an operation unit 400 is provided with a frame advance key 411, a frame rewind key 413 and a pause key 412 (instruction receiving portion). The frame advance key 411 receives an instruction to switch the display screen of the display device 410 to a next screen. The pause key 412 receives an instruction to pause the display screen of the display device 410 to obtain a still image and an instruction to cancel the pause of the display screen. The frame rewind key 413 receives an instruction to switch the display screen of the display device 410 to one preceding screen. Images of the frame advance key 411, the frame rewind key 413 and the pause key 412 are displayed on the display device 410 by a display controller 523.

Figure 16:
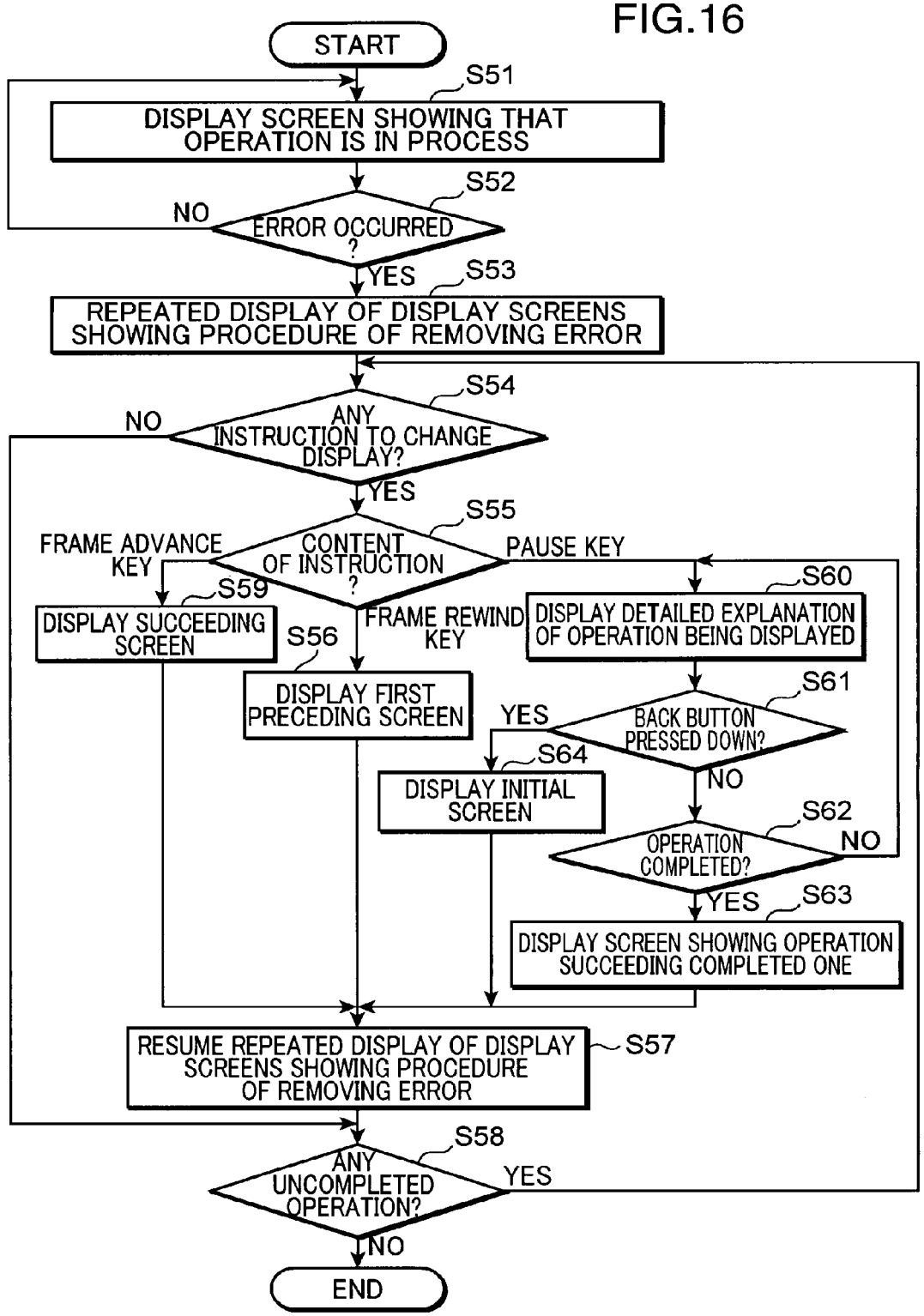
FIG. 16 is a flow chart showing the screen display switching control of the display device in the event of an operation error.
Figure 17:
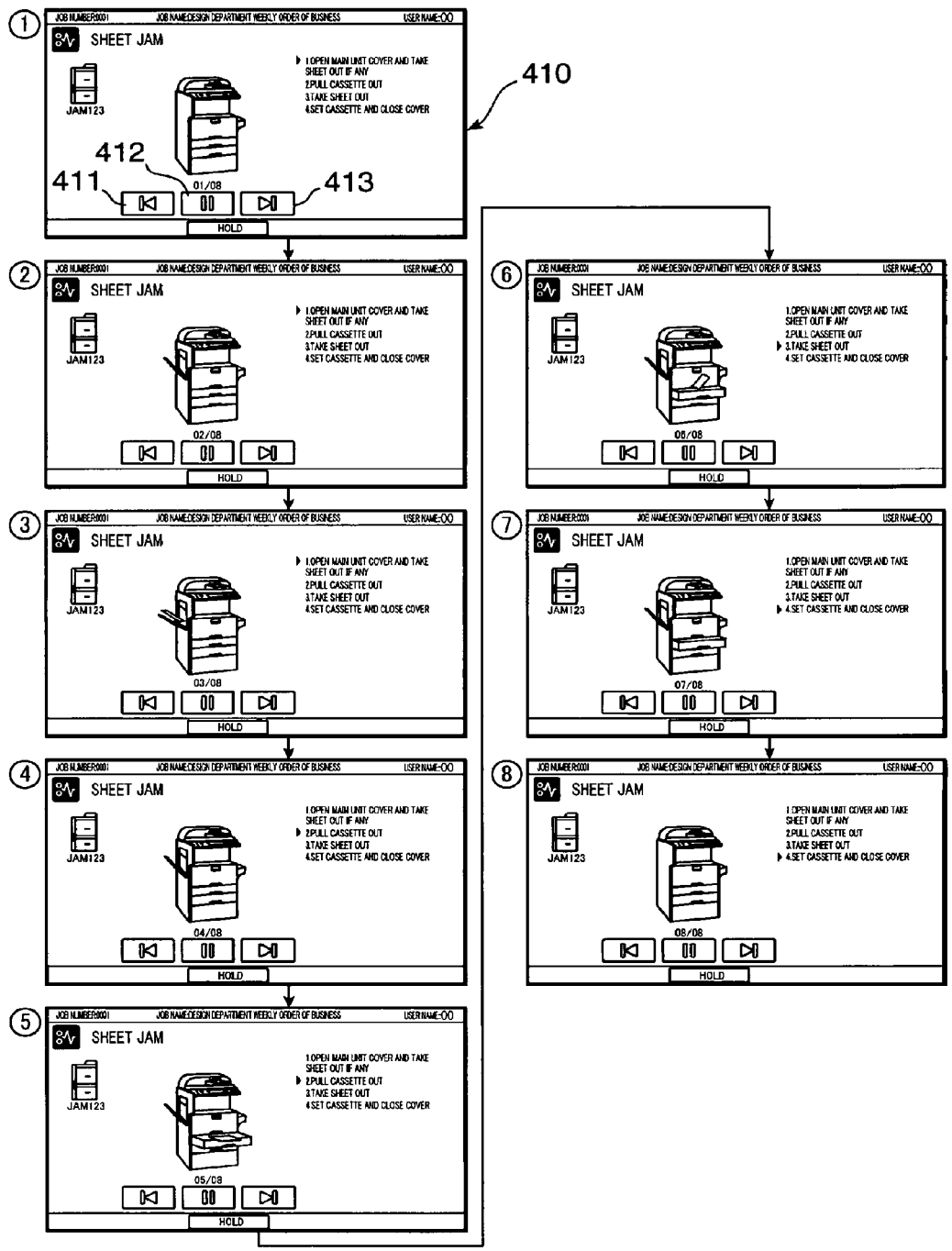
FIG. 17 is a transition diagram of display screens showing an operation procedure in the event of an operation error caused by a sheet jam.
Figure 18:
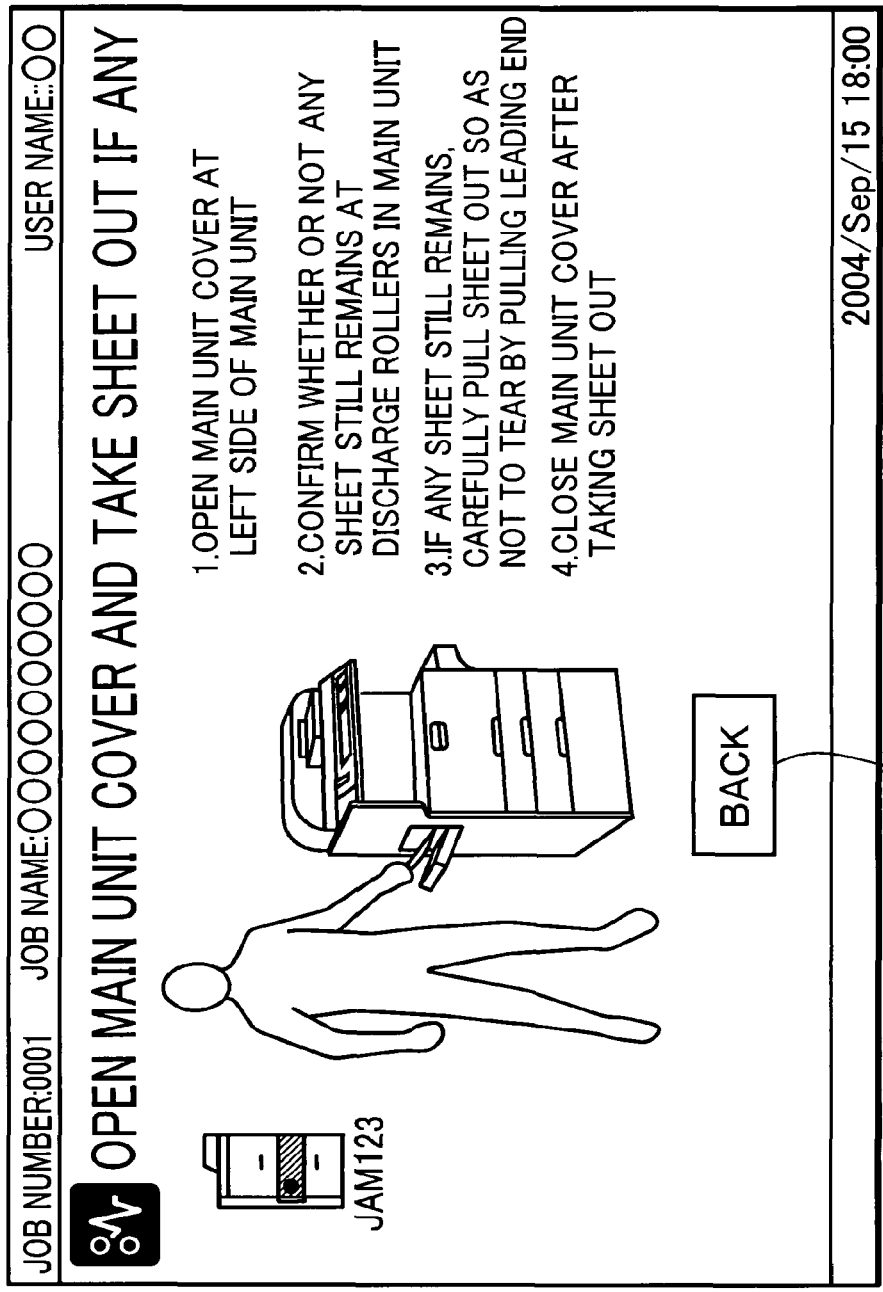
FIG. 18 is a diagram showing a display example of detailed explanation.

Next, the fifth embodiment of the screen display switching control of the display device 410 in the event of an operation error in the composite apparatus 1 is described. FIG. 16 is a flow chart showing the fifth embodiment of the screen display switching control of the display device 410 in the event of an operation error, FIG. 17 is a diagram showing the transition of display screens showing an operation procedure in the event of an operation error caused by a sheet jam, and FIG. 18 is a diagram showing a display example of detailed explanation. It should be noted that operations similar to those of the first to fourth embodiments are not described.

If an error detector 522 detects an operation error, for example, caused by a sheet jam during a copying operation (YES in Step S52), the display controller 523 reads data corresponding to an operation procedure necessary to remove the operation error caused by the sheet jam from a display image data storage 53 and reproduces them, thereby causing the display device 410 to display this operation procedure (Step S53). At this time, the display controller 523 causes the display device 410 to repeatedly display screens showing a series of operations constituting the operation procedure of removing the operation error caused by the sheet jam in rotation at a predetermined speed, for example, as shown in (1) to (8) of FIG. 17, wherein images of the frame advance key 411, the frame rewind key 413 and the pause key 412 are displayed in each screen.

If the operator operates the frame advance key 411, the pause key 412 or the frame rewind key 413 (YES in Step S54) while the display controller 523 is causing the display device 410 to display the respective display screens of the operation procedure in Step S53, the display controller 523 performs the following process.

If the operator presses the frame advance key 411 down ("FRAME ADVANCE KEY" in Step S55), the display controller 523 causes the screen succeeding the one being displayed at this moment to be displayed (Step S59) and resumes the repeated display of the respective screens showing a series of operations constituting the operation procedure from a state where this succeeding screen is displayed (Step S57). For example, the display controller 523 causes the display device 410 to display the screen shown in (6) of FIG. 17 if the operator presses the frame advance key 411 down while the screen shown in (5) of FIG. 17 is displayed on the display device 410. Then, the display controller 523 causes the respective screens to be repeatedly displayed in rotation from a state where the screen shown in (6) of FIG. 17 is displayed on the display device 410.

Further, if the operator presses the frame rewind key 413 down ("FRAME REWIND KEY" in Step S55), the display controller 523 causes the screen preceding the one being displayed at this moment by one frame to be displayed (Step S56) and resumes the repeated display of the respective screens showing a series of operations constituting the operation procedure from a state where this preceding screen is displayed (Step S57). For example, the display controller 523 causes the display device 410 to display the screen shown in (4) of FIG. 17 if the operator presses the frame rewind key 413 down while the screen shown in (5) of FIG. 17 is displayed on the display device 410. Then, the display controller 523 causes the respective screens to be repeatedly displayed in rotation from a state where the screen shown in (4) of FIG. 17 is displayed on the display device 410.

Further, if the operator presses the pause key 412 down ("PAUSE KEY" in Step S55), the display controller 523 specifies an operation guided by the screen displayed on the display device 410 at this moment, reads the display data of detailed explanation corresponding to this operation from the display image data storage 53 and causes the display device 410 to display the read data (Step S60). For example, the display controller 523 reads the data of detailed explanation corresponding to the operation (operation indicated by a guide "OPEN MAIN UNIT COVER AND TAKE SHEET OUT IF ANY", i.e. operation of opening the main unit cover and taking a sheet out) guided by this display screen from the display image data storage 53 and causes the display device 410 to display a screen as shown in FIG. 18 if the operator presses the pause key 412 down while the screen shown in (3) of FIG. 17 is displayed on the display device 410. On this display screen of the detailed explanation, a BACK button 414 (utilizing a touch sensor function) used to input an instruction to return the display on the display device 410 to the initial animated display for guiding the operation procedure is displayed by the display controller 523.

If the BACK button 414 is pressed down by the operator (YES in Step S61) while the display controller 523 is causing the display device 410 to display the detailed explanation as described above, the display controller 523 causes the display screen displayed when the pause key 412 was pressed down by the operator in Step S55 to be displaced again on the display device (Step S64) and the repeated display of the respective screens showing a series of operations constituting the operation procedure is resumed from this display screen (Step S57).

Unless the BACK button 414 is pressed down by the operator (NO in Step S61), the display controller 523 causes the display device 410 to display the above detailed explanation until the judging device 524 judges that the operation guided by this detailed explanation has been completed (NO in Step S62, Step S60). If the judging device 524 judges that the operation guided by this detailed explanation has been completed (YES in Step S62), the display controller 523 causes the screen showing the operation succeeding the one judged to have been completed to be displayed (Step S63) and resumes the repeated display of the respective screens showing a series of operations constituting the operation procedure (Step S57). For example, if it is assumed that the operation of the operator to open the main unit cover and take a sheet out is guided by the screen of the detailed explanation shown in FIG. 18 (screen of the detailed explanation corresponding to the screens of (1) to (3) in FIG. 17) and the completion of this operation is judged by the judging device 524 at this time, the display controller 523 causes the display device 410 to display the screen of (4) in FIG. 17 showing the operation succeeding the completed one.

In this control, the display controller 523 causes the screen showing the operation succeeding the one judged to have been completed to be displayed (Step S63) if the judging device 524 judges that the operation guided by the detailed explanation has been completed as described above (YES in Step S62). However, the display controller 523 may resume the repeated display of the respective screens showing a series of operations constituting the operation procedure from the first screen showing the operation procedure instead of the operation in Step S63.

The repeated display of the respective screens showing a series of operations constituting the operation procedure by the display controller 523 is continued until the judging device 524 judges the completion of all the operations necessary to remove the operation error by this operation procedure (YES in Step S58), and the display controller 523 ends the process when the judging device 524 judges the completion of all the operations necessary to remove the operation error by this operation procedure (NO in Step S58). In other words, the display controller 523 ends the animated display of the operation procedure on the display device 410.

In this way, the operator can obtain further information on the operation being displayed since the detailed explanation on the operation guided by the display screen of the display device 410 is displayed on the display device 410 if the pause key 412 is pressed down. The understanding of this operation can be deepened. If the operator completes the operation guided by this detailed explanation during the display of the detailed explanation, the screen showing the operation succeeding the completed one is displayed on the display device 410, wherefore the operator can immediately recognize the operation to be performed next.

Figure 19:
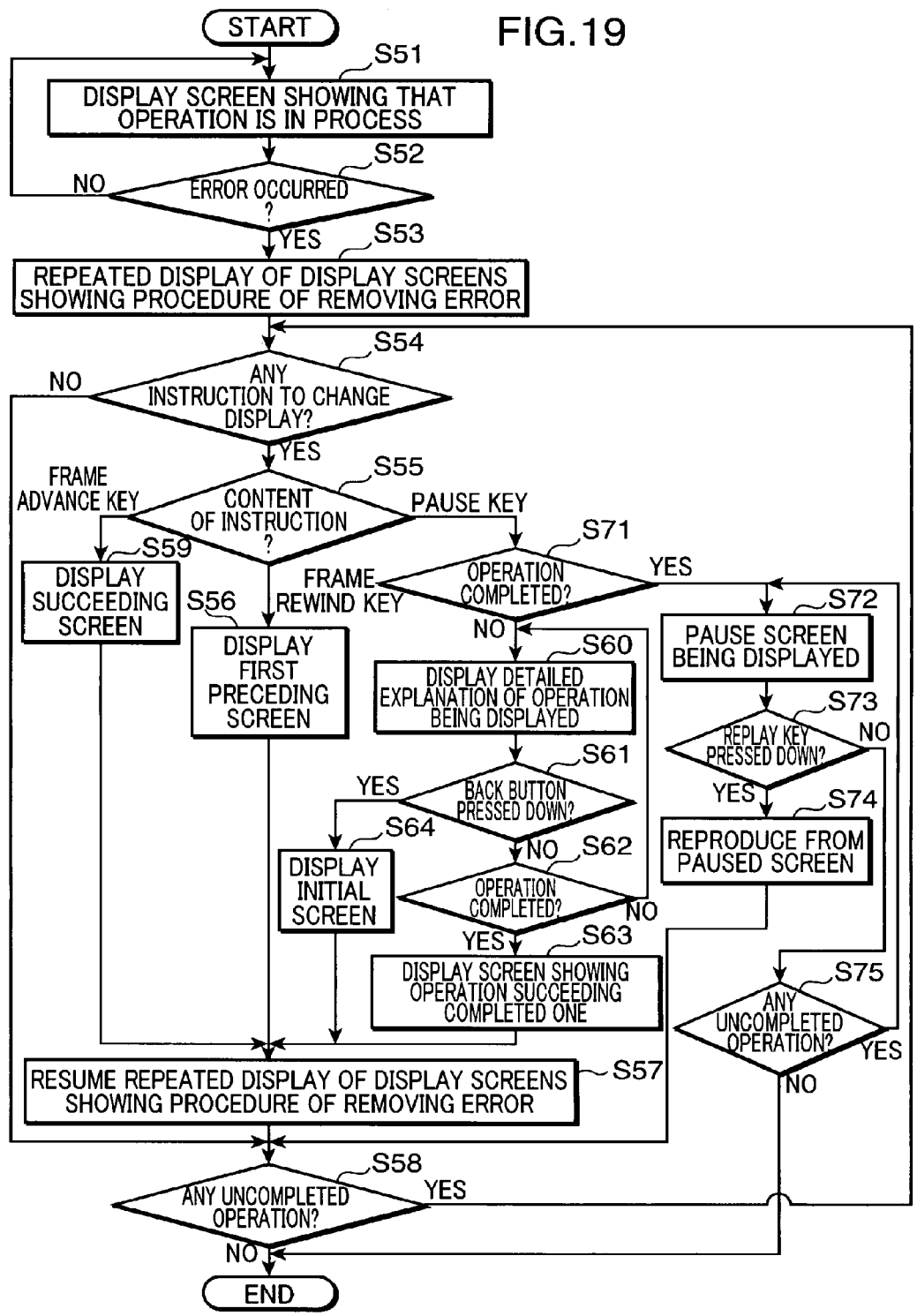
FIG. 19 is a flow chart showing the sixth embodiment of the screen display switching control of the display device in the event of an operation error in the composite apparatus.

Next, the sixth embodiment of the screen display switching control of the display device 410 in the event of an operation error in the composite apparatus 1 is described with reference to FIG. 19 as well as FIG. 17. FIG. 19 is a flow chart showing the sixth embodiment of the screen display switching control of the display device 410 in the event of an operation error. It should be noted that operations in FIG. 19 similar to those of the fifth embodiment shown in FIG. 16 are identified by the same reference numerals and not described.

In this sixth embodiment, if the pause key 412 is pressed down by the operator while the display controller 523 is causing the display device 410 to display the moving images of the operation procedure (YES in Step S54, "PAUSE KEY" in Step S55), the display controller 523 detects whether this operation is judged to have been completed or not to have been completed yet by the judging device 524. The display controller 523 causes the display device 410 to display the detailed description on the operation not completed yet (S60), only if the operation is judged not to have been completed yet (NO in Step S71).

If the pause key 412 is pressed down by the operator while the display controller 523 is causing the display device 410 to display the moving images of the operation procedure, but the operation guided by the display screen at this moment is judged to have been completed by the judging device 524 (YES in Step S71), the display controller 523 causes the screen at this moment to pause and to be displayed on the display device 410 (Step S72). For example, the display controller 523 causes the screen of (5) in FIG. 17 to pause and to be displayed on the display device 410 while causing the display device 410 to display the screen shown in (5) of FIG. 17. It should be noted that the display controller 523 causes a replay key (utilizing a touch sensor function) to be displayed on this paused screen. The replay key cancels the paused state to receive an instruction to resume the repeated display of the respective screens showing a series of operations constituting the operation procedure.

If the replay key is pressed down by the operator (YES in Step S73) while the display controller 523 is causing the display of the display device 410 to pause, the display controller 523 resumes the repeated display of the respective screens showing a series of operations constituting the operation procedure from this paused screen (Step S74). Unless the replay key is pressed down by the operator (NO in Step S73), the display controller 523 continues the display of the screen paused in Step S72 until the judging device 524 judges the completion of all the operations necessary to remove the operation error by this operation procedure (YES in Step S75) and ends the process when the judging device 524 judges the completion of all the operations necessary to remove the operation error by this operation procedure (NO in Step S75).

According to this control, the display controller 523 does not cause the display device 410 to display the detailed explanation on the operation already completed and unnecessary to be performed by the operator even if the operator presses the pause key 412 down. Therefore, the operator needs not read the detailed explanation for unnecessary operations.

Figure 20:
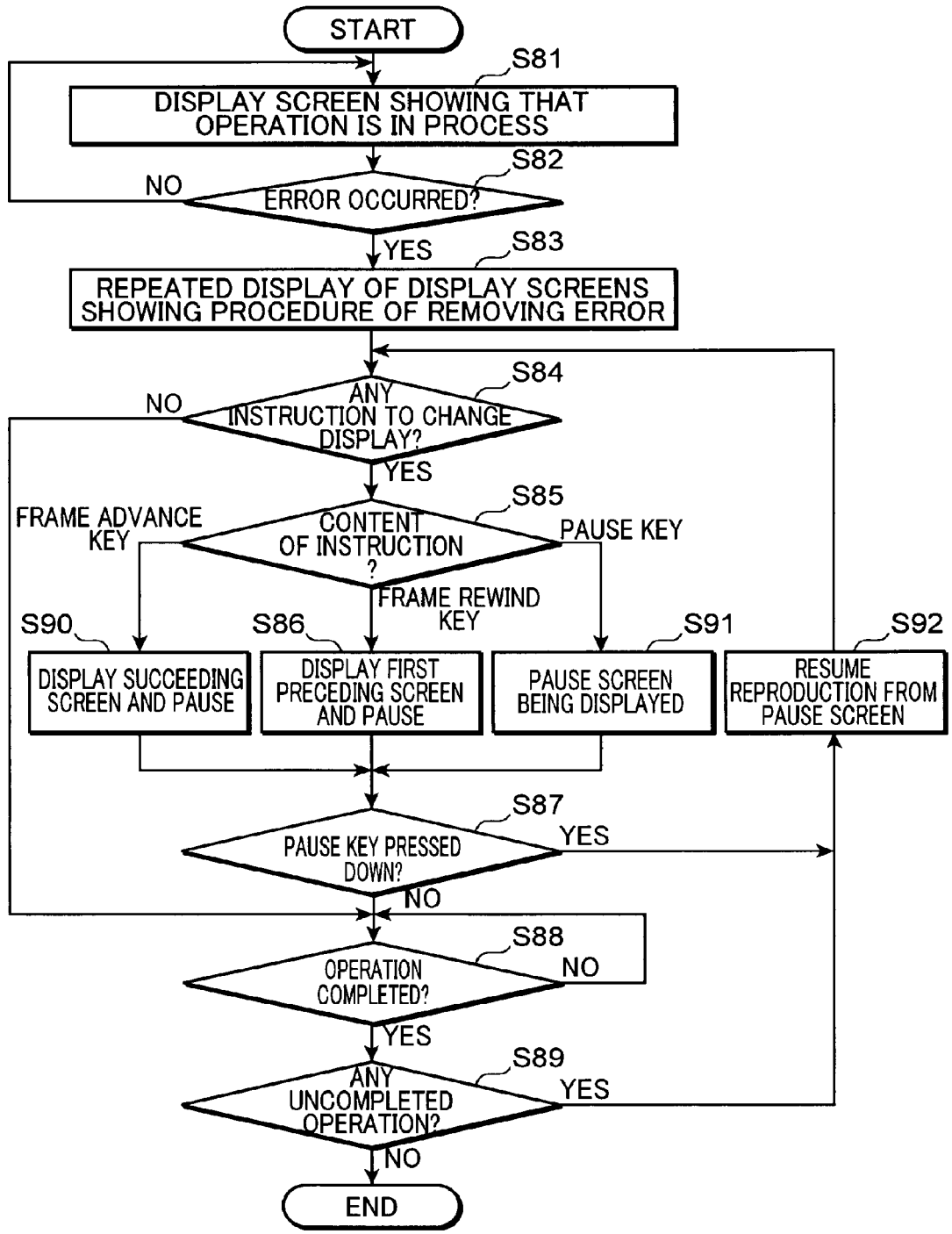
FIG. 20 is a flow chart showing the seventh embodiment of the screen display switching control of the display device in the event of an operation error in the composite apparatus.

Next, the seventh embodiment of the screen display switching control of the display device 410 in the event of an operation error in the composite apparatus 1 is described with reference to FIG. 20 as well as FIG. 17. FIG. 20 is a flow chart showing the seventh embodiment of the screen display switching control of the display device 410 in the event of an operation error. It should be noted that operations similar to those of the first to sixth embodiments are not described.

In the seventh embodiment, if an instruction to switch the display screen of the display device 410 (hereinafter, "display switching instruction") is received by the frame advance key 411, the pause key 412 or the frame rewind key 413 through an operation by the operator while the display controller 523 is causing the display device 410 to display the above moving images, the display controller 523 performs the following process in accordance with the content of this display switching instruction.

If the frame rewind key 413 receives an instruction to switch the display screen of the display device 410 to the first preceding screen ("FRAME REWIND KEY" in Step S85), the display controller 523 switches the screen being displayed at this moment to the first preceding screen and causes the screen after the switch to pause and to be displayed as a still image on the display device 410 (Step S86). For example, if the frame rewind key 413 receives the above instruction from the operator while the display controller 523 is causing the display device 410 to display the screen shown in (5) of FIG. 17, the display controller 523 cause the display device 410 to display the screen shown in (4) of FIG. 17 and cause the display to pause in this state. Although the display controller 523 causes the screen switch to pause at this screen, the animated display on this screen may not pause (same holds for Steps S90 to S92).

Further, if the frame advance key 411 receives an instruction to switch the display screen of the display device 410 to the first succeeding screen (screen advanced by one frame) ("FRAME ADVANCE KEY" in Step S85), the display controller 523 switches the screen being displayed at this moment to the first succeeding screen (next screen) and causes the screen after the switch to pause and to be displayed as a still image on the display device 410 (Step S90). For example, if the frame advance key 411 receives the above instruction from the operator while the display controller 523 is causing the display device 410 to display the screen shown in (5) of FIG. 17, the display controller 523 causes the display device 410 to display the screen shown in (6) of FIG. 17 and causes the display to pause in this state.

Further, if the pause key 412 receives an instruction to pause the display screen of the display device 410 ("PAUSE KEY" in Step S85), the display controller 523 causes the screen being displayed at this moment to pause and to be displayed as a still image on the display device 410 (Step S91). For example, if the pause key 412 receives the above instruction from the operator while the display controller 523 is causing the display device 410 to display the screen shown in (5) of FIG. 17, the display controller 523 causes the display device 410 to pause at the screen shown in (5) of FIG. 17 being displayed at this moment.

If an instruction to cancel the paused display is received through the operation of the pause key 412 by the operator while the display controller 523 is causing the display of the display device 410 to pause by any one of the above processings (YES in Step S87), the display controller 523 resumes the repeated display of the respective screens showing a series of operations constituting the operation procedure from this paused screen (Step S92). Thereafter, this process returns to Step S84.

If the judging device 524 judges that the operation guided by the display device 410 has been completed by the operator (YES in Step S88) although no instruction to cancel the paused display has been received (NO in Step S87) while the display controller 523 is causing the display of the display device 410 to pause as described above, the display controller 523 resumes the repeated display of the respective screens showing a series of operations constituting the operation procedure from this paused screen (Step S92) if the judging device 524 judges that all the operations necessary to remove the operation error caused by the sheet jam have not been completed yet (YES in Step S89). Thereafter, this process returns to Step S84. It should be noted that the display controller 523 ends this process if the judging device 524 judges that the operation guided by the display device 410 has been completed by the operator (YES in Step S88) and that all the operations necessary to remove the operation error caused by the sheet jam have been completed (NO in Step S89). In other words, the display controller 523 ends the animated display of the operation procedure on the display device 410.

In this way, only by pressing the frame advance key 411 or the frame rewind key 413 down, the operator can cause the screen different from the one being displayed at this moment to be displayed as a still image on the display device 410. Thus, the operator can confirm for a long time by switching the screen being displayed to another screen through a simple operation.

Next, the eighth embodiment of the screen display switching control of the display device 410 in the event of an operation error in the composite apparatus 1 is described with reference to FIG. 21 as well as FIG. 17. FIG. 21 is a flow chart showing the eighth embodiment of the screen display switching control of the display device 410 in the event of an operation error. It should be noted that operations similar to those of the seventh embodiment are identified by the same reference numerals and not described.

In the eighth embodiment, the display device 410 includes a restart key (not shown) in addition to the frame advance key 411, the pause key 412 and the frame rewind key 413 by the display control of the display controller 523. The restart key is for receiving an instruction to cause the display device 410 to display the first screen (screen showing the first one of a series of operations to remove the operation error) of the operation procedure. In other words, the restart key employing a touch panel function is further displayed on the display screen of the display device 410, and receives the instruction to cause the display device 410 to display the first screen upon being pressed down by the operator.

If the restart key receives the instruction to switch the screen display of the display device 410 to the first screen through the operation of the operator (YES in Step S84, "RESTART KEY" in Step S85) while the display controller 523 is causing the display device 410 to display the operation procedure of removing the operation error (Step S83), the display controller 523 switches the screen being displayed at this moment to the first screen and further causes the screen after the switch to pause and to be displayed as a still image on the display device 410 (Step S95). For example, if the restart key receives the above instruction from the operator while the display controller 523 is causing the display device 410 to display any one of the screens shown in (2) to (8) of FIG. 17, the display controller 523 causes the first screen shown in (1) of FIG. 17 to be displayed and cause the display to pause in this state.

Thus, the operator can confirm this first screen for a long time by causing the display device 410 to display the first screen of the operation procedure through a simple operation.

In the seventh and eighth embodiments, the display controller 523 switches the display screen of the display device 410 to the first succeeding or preceding screen and causes the screen after the switch to pause and to be displayed on the display device 410 if the frame advance key 411 or the frame rewind key 413 receives the display switching instruction. However, the display controller 523 may advance or rewind the display screen of the display device 410 by two or more frames and causes the resulting screen to pause.

In the seventh and eighth embodiments, the display controller 523 causes the screen after the switch to pause and to be displayed on the display device 410 if the frame advance key 411 or the frame rewind key 413 receives the display switching instruction. However, the display controller 523 may, instead, enable the operator to confirm the screen after the switch by eye by setting a speed at which the screen after the switch is switched to a next new screen slower than a speed at which the display controller 523 switches the respective screens in rotation when no display switching instruction is received by the frame advance key 411 or the frame rewind key 413.

Next, a ninth embodiment of the screen display switching control of a display device 410 in the event of an operation error in a composite apparatus 1 is described. FIG. 22 is a control block diagram of the composite apparatus 1 executing the screen display switching control of the ninth embodiment.

It should be noted that the same construction as in the composite apparatus 1 shown in FIG. 2 or 15 are not described.

A CPU 52 of the composite apparatus 1 is provided with a display screen discriminator 525 in addition to an operation controller 521, an error detector 522, a display controller 523 and a judging device 524.

The display screen discriminator (display screen discriminating portion) 525 discriminates an instruction inputted by an operator in accordance with an operation mode of a frame advance key 411 or a frame rewind key 413 adopted by the operator, and discriminates a display screen on the display device 410 indicated by the discriminated instruction. For example, the display screen discriminator 525 discriminates whether a frame advance key 411 or a frame rewind key 413 was pressed down in a predetermined mode, e.g. pressed down for a shorter period (e.g. shorter than 1 sec.: same below) or pressed down for a longer period (e.g. 1 to several sec.: same below), discriminates the instruction from the operator based on this discrimination result, and discriminates the screen to be displayed on the display device 410 based on this discriminated instruction. For example, the display controller 523 discriminates the instruction from the operator and the display screen indicated by this instruction such as follows: (1) discriminates the screen succeeding the one being displayed when the frame advance key 411 is pressed down for a shorter period; (2) discriminates the screen showing the operation (operation to be performed next by the operator) succeeding the one already completed by the operator out of the operation procedure being displayed if the frame advance key 411 is pressed down for a longer period; (3) discriminates the screen preceding the one being displayed when the frame rewind key 413 is pressed down for a shorter period; and (4) discriminates the first screen of the operation procedure being displayed (screen showing the first operation out of a series of operations to remove the operation error) if the frame rewind key 413 is pressed down for a longer period.

Next, the ninth embodiment of the screen display switching control of the display device 410 in the event of an operation error is described with reference to FIG. 23 as well as FIG. 17. FIG. 23 is a flow chart showing the ninth embodiment of the screen display switching control of the display device 410 in the event of an operation error. It should be noted that operations similar to those of the first to eighth embodiments are not described.

In this ninth embodiment, the display controller 523 performs the following process if the operator operates the frame advance key 411, the pause key 412 or the frame rewind key 413 (YES in Step S104) while the display controller 523 is causing the display device 410 to display the above moving images.

If the operator has pressed the frame advance key 411 down ("FRAME ADVANCE KEY" in Step S105), the display screen discriminator 525 discriminates whether the operator has pressed for a shorter period or for a longer period (Step S110). If discriminating that the operator has pressed for a shorter period (NO in Step S110), the display screen discriminator 525 discriminates the screen succeeding the one being displayed at this moment as the screen to be displayed on the display device 410 (Step S111). The display controller 523 resumes the repeated display of the respective screens showing a series of operations constituting the operation procedure from this discriminated screen (succeeding screen) (Step S108). For example, if the frame advance key 411 is pressed down for a shorter period by the operator while the screen shown in (5) of FIG. 17 is being displayed on the display device 410, the display controller 523 causes the display device 410 to display the screen shown in (6) of FIG. 17. The display controller 523 repeatedly displays the respective screens in rotation from the state where the screen in (6) of FIG. 17 is displayed on the display device 410.

On the other hand, if discriminating that the operator has pressed for a longer period (YES in Step S110), the display screen discriminator 525 discriminates the operation already completed by the operator based on a judgment result of the judging device 524 and discriminates the screen showing the operation succeeding this completed operation as the screen to be displayed on the display device 410 (Step S112). The display controller 523 resumes the repeated display of the respective screens showing a series of operations constituting the operation procedure from this discriminated screen (Step S108). For example, if the frame advance key 411 is pressed down for a longer period by the operator and the operation guided by "1. OPEN MAIN UNIT COVER AND TAKE SHEET OUT IF ANY" displayed on the display device 410, i.e. the operation of the operator to open the main unit cover and to take a sheet out is judged to have been completed by the judging device 524 while the screen shown in (1) of FIG. 17 is being displayed on the display device 410, the display controller 523 causes the display device 410 to display the screen shown in (4) of FIG. 17 showing the operation succeeding this completed operation. The display controller 523 repeatedly displays the respective screens in rotation from the state where the screen in (4) of FIG. 17 is displayed on the display device 410.

If the operator has pressed the frame rewind key 413 down ("FRAME REWIND KEY" in Step S105), the display screen discriminator 525 discriminates whether the operator has pressed for a shorter period or for a longer period (Step S106). If discriminating that the operator has pressed for a shorter period (NO in Step S106), the display screen discriminator 525 discriminates the first preceding screen of the one being displayed at this moment as the screen to be displayed on the display device 410 (Step S113). The display controller 523 resumes the repeated display of the respective screens showing a series of operations constituting the operation procedure from this discriminated screen (first preceding screen) (Step S108). For example, if the frame rewind key 413 is pressed down for a shorter period by the operator while the screen shown in (5) of FIG. 17 is being displayed on the display device 410, the display controller 523 causes the display device 410 to display the screen shown in (4) of FIG. 17. The display controller 523 repeatedly displays the respective screens in rotation from the state where the screen in (4) of FIG. 17 is displayed on the display device 410.

On the other hand, if discriminating that the operator has pressed for a longer period (YES in Step S106), the display screen discriminator 525 discriminates the first screen of the operation procedure being displayed as the screen to be displayed on the display device 410 (Step S107). The display controller 523 resumes the repeated display of the respective screens showing a series of operations constituting the operation procedure from this discriminated screen (first screen) (Step S108). For example, if the frame rewind key 413 is pressed down for a longer period by the operator while the screen shown in (7) of FIG. 17 is being displayed on the display device 410, the display controller 523 causes the display device 410 to display the first screen shown in (1) of FIG. 17. The display controller 523 repeatedly displays the respective screens in rotation from the state where the screen in (1) of FIG. 17 is displayed on the display device 410.

If the operator has pressed the pause key 412 ("PAUSE KEY" in Step S105), the display controller 523 causes the screen being displayed at this moment to pause (i.e. the display screen is not switched to another screen showing another operation) and to be displayed as a still image on the display device 410 (Step S114). For example, if the pause key 412 is pressed down by the operator while the display controller 523 is causing the display device 410 to display the screen shown in (5) of FIG. 17, the display controller 523 causes the screen shown in (5) of FIG. 17 being displayed at this moment to pause and to be displayed on the display device 410. If the pause key 412 is pressed down again by the operator (YES in Step S115) while the display controller 523 is causing the display of the display device 410 to pause in this way, the display controller 523 resumes the repeated display of the respective screens showing a series of operations constituting the operation procedure from this paused screen (Step S116).

Unless the pause key 412 is pressed down again by the operator (NO in Step S115), the display controller 523 keeps the paused state until the judging device 524 judges that all the operations necessary to remove the operation error by this operation procedure have been completed (YES in Step S117). The display controller 523 ends this process if the judging device 524 judges that all the operations have been completed (NO in Step S117).

The repeated display of the respective screens showing a series of operations constituting the operation procedure by the display controller 523 (Step S108) is continued until the judging device 524 judges that all the operations necessary to remove the operation error by this operation procedure have been completed (YES in Step S109), and the display controller 523 ends this process when the judging device 524 judges that all the operations have been completed (NO in Step S109). In other words, the display controller 523 ends the animated display of the operation procedure on the display device 410.

In this way, the operator can input the instruction to switch to a corresponding different display screen by pressing the frame advance key 411 or the frame rewind key 413 either for a shorter period or for a longer period. Thus, when the operator carries out an operation in accordance with the operation guide displayed on the display device 410, the display screen of the display device 410 can be immediately switched to a desired screen with a simple operation. Further, many instructions can be received from the operator even without increasing the number of keys displayed on the display device 410, and the display controller 523 can cause the display device 410 to display screens in conformity with the respective instructions.

In the ninth embodiment, the display device 410 is provided with the frame advance key 411 and the frame rewind key 413 and the display controller 523 executes such a control as to differ the screen to be displayed on the display device 410 depending on whether these keys are pressed down for a shorter period or for a longer period. However, the operation mode is not limited to the one in which the keys are pressed down for a shorter period or for a longer period, the keys provided on the display device 410 are note limited to the frame advance key 411 and the frame rewind key 413 and the number of the keys provided on the display device 410 is not limited to two. For example, a single key may be provided on the display device 410 instead of the frame advance key 411 and the frame rewind key 413, and the screen caused to be displayed on the display device 410 by the display controller 523 may be made different in accordance with the operation mode of this single key (e.g. the duration of one press-down operation, the number of press-down operations of the key within a specified period, etc.).

Further in the ninth embodiment, the display controller 523 causes the display device 410 to display the screen showing the operation succeeding the already completed operation if the frame advance key 411 has been pressed down for a longer period by the operator, and causes the display device 410 to display the first screen of the operation procedure if the frame rewind key 413 has been pressed down for a longer period by the operator. However, the screens displayed by the switch in accordance with the operation mode of the frame advance key 411 or the frame rewind key 413 adopted by the operator are not limited to the above screens, and the display controller 523 may switch the display screen to other screens in accordance with the operation mode of the frame advance key 411 or the frame rewind key 413.

It should be appreciated that the present invention is not limited to the constructions of the foregoing respective embodiments and various modifications can be made. For example, the screen display switching control in the case where the display controller 523 causes the operation procedure of removing the operation error caused by the sheet jam is described as an example in the foregoing respective embodiments. However, the present invention is, of course, also applicable to a screen display switching control in the case where the display controller 523 causes an operation procedure of removing an abnormal stop caused by the breakdown of the image forming assembly 33, the transferring assembly 34 or the like. Further, the operation procedure is not limited to the one for the removal of an operation error and the present invention is also applicable to the case where the display controller 523 causes the display device 410 to display an operation procedure of guiding another operation (e.g. how to replenish the sheet cassette with sheets).

Although the construction and the process of the composite apparatus 1 are shown in FIGS. 1 to 23 in the foregoing respective embodiments, these are merely examples and the construction and the process of the composite apparatus 1 according to the present invention are not limited to these.

Although the image forming apparatus according to the present invention is described as the composite apparatus 1 in the foregoing respective embodiments, it is not limited to a composite apparatus.

To sum up, the present invention is directed to an image forming apparatus comprising display portion for displaying an operation guide to an operator, and display controller for causing the display portion to display an operation procedure comprised of a plurality of operations as the operation guide while automatically switching the respective operations in rotation.

According to the present invention, since the display controller causes the display portion to display the operation procedure comprised of the plurality of operations as the operation guide while automatically switching the respective operations in rotation, the operator can grasp an operation next to the one being displayed on the display portion without being forced to switch a display screen.

In the present invention, the display controller causes the display portion to display the stage of the operation being displayed in the operation procedure when the display screens of the respective operations constituting the operation procedure are displayed.

According to this invention, the operator can easily grasp the progress of the operations by confirming the displayed stage by eye since the stage of the operation being displayed in the operation procedure is also displayed when the operation procedure comprised of the plurality of operations is displayed operation by operation in rotation on the display portion.

In the present invention, the display controller causes the stage of the operation being displayed in the operation procedure to be displayed by causing the display of the number of all the operations constituting the operation procedure and the order of the predetermined operation to be performed at the present moment by the operator in all the operations.

According to this invention, the operator can easily understand how far all the operations have been completed while carrying out a series of operations in accordance with the operation procedure, and can also grasp how many operations have been completed up to the present moment, how many operations have to be performed yet to remove an error or the like, therefore being able to precisely understand the progress of the operations.

In the present invention, the display controller causes all the operations constituting the operation procedure to be displayed and causes the predetermined operation to be performed at the present moment by the operator to be displayed differently from the preceding and succeeding operations when the respective operations constituting the operation procedure are displayed.

According to this invention, the operator can specifically grasp the number of all the operations and can precisely understand which operation is being presently performed when carrying out a series of operations in accordance with the operation procedure.

In the present invention, judging portion for judging whether or not the respective operations constituting the operation procedure have been completed by the operator is further provided, and the display controller causes all the operations constituting the operation procedure to be displayed and causes the operation judged to have been completed by the judging portion to be displayed differently from the other operations when the respective operations constituting the operation procedure are displayed.

According to this invention, the operator can recognize that the operation displayed differently from the others was already completed by seeing the display of the display portion. Thus, the operator can clearly distinguish the operations already completed and those yet to be completed. Further, the operator can easily grasp the progress of the operations (up to which stage a series of operations necessary to remove the operation error have been completed).

In the present invention, judging portion for judging whether or not the respective operations constituting the operation procedure have been completed by the operator is further provided, and the display controller causes the display portion to display the operation guide by repeatedly reproducing the display screens of the respective operations constituting the operation procedure in rotation after changing the display format of the display screen showing the operation judged to have been completed by the judging portion to the one different from that of the other operations.

According to this invention, the operator can easily recognize that the operation displayed in the different format is the already completed operation. Thus, the operator can clearly distinguish the operations already completed and those yet to be completed and, further, can easily grasp the progress of the operations.

In the present invention, the display controller causes the display portion to display the operation guide by repeatedly reproducing the display screens of the respective operations constituting the operation procedure in rotation after causing the display format of the display screen showing the operation judged to have been completed by the judging portion to differ from that of the display screens of the other operations and deleting a display portion that became unnecessary for the guidance of the operator upon the completion of the operation.

According to this invention, the display of the display portion can be simplified and the operator can more easily grasp the operations needed to be performed yet since the display having become unnecessary for the operator to see is not made.

In the present invention, instruction receiving portion for receiving an instruction to pause the display screen of the display portion from the operator is further provided, and the display controller causes the display portion to display the operation guide by repeatedly reproducing the plurality of screens constituting the operation procedure at a predetermined speed in rotation, and causes the display portion to display the detailed explanation of the operation guided on the screen being displayed when a pause instruction is received if the pause instruction from the operator is received by the instruction receiving portion.

According to this invention, the operator can obtain further information on this operation to deepen the understanding of this operation since the detailed explanation of the operation guided on the display screen is displayed when the pause instruction from the operator is received.

In the present invention, judging portion for judging whether or not the respective operations guided by the operation guide have been completed by the operator is further provided, and the display controller resumes the repeated reproduction of the respective screens constituting the operation procedure if the operation guided on the screen being displayed is judged to have been completed by the judging portion when the detailed explanation is displayed on the display portion.

According to this invention, only if the operator finishes the operation to be performed for the removal of the operation error, the detailed explanation of the operation being displayed ends and the reproduction of the respective screens constituting the operation procedure resumes. Thus, the operator needs not see the screen having become unnecessary to see and can go on to the confirmation of the respective screens constituting the operation procedure.

In the present invention, the display controller resumes the repeated reproduction of the respective screens constituting the operation procedure from the screen showing the operation succeeding the one judged to have been completed if the operation guided on the screen being displayed is judged to have been completed by the judging portion when the detailed explanation is displayed on the display portion.

According to this invention, only if the operator finishes the operation to be performed for the removal of the operation error while the detailed explanation is being displayed, he can confirm each screen of the operation procedure by eye from the screen showing the operation succeeding the completed one, therefore being able to immediately confirm the operation to be performed next.

In the present invention, judging portion for judging whether or not the respective operations guided by the operation guide have been completed by the operator is further provided, and the display controller causes the display portion to display the detailed explanation on the operation guided on the screen being displayed if the pause instruction from the operator is received by the instruction receiving portion and the operation guided on the screen being displayed is judged not to have been completed by the judging portion.

According to this invention, unless the operation guided on the display screen at this moment has not been completed yet even though the pause instruction from the operator is received by the instruction receiving portion, the detailed explanation on this operation is not displayed. Thus, the operator can be prevented from seeing the display screen showing the detailed explanation unnecessary to see.

In the present invention, the display controller causes the screen being displayed to pause and to be displayed on the display portion without displaying the detailed explanation of the operation guided on the screen being displayed if the pause instruction from the operator is received by the instruction receiving portion and the operation guided on the screen being displayed is judged to have been completed by the judging portion.

According to this invention, unless the operation guided on the display screen at this moment is yet to be completed even although the pause instruction from the operator is received by the instruction receiving portion, the detailed explanation on this operation is not displayed and only the display screen at this moment is caused to pause. Thus, the operator can be prevented from seeing the display screen showing the detailed explanation unnecessary to see.

In the present invention, instruction receiving portion for receiving an instruction to switch the display of the display portion to another screen from the operator, and the display controller causes the display portion to display the operation guide by repeatedly reproducing the respective screens constituting the operation procedure at a predetermined speed in rotation, and switches the display of the display portion to another screen and sets a speed at which the another screen is switched to a next screen slower than the predetermined speed if an instruction to switch the display of the display portion to another screen is received by the instruction receiving portion.

According to this invention, the operator can confirm another screen different from the screen being displayed on the display portion for a long time only by carrying out a simple operation of inputting the instruction to switch to another screen to the instruction receiving portion.

In the present invention, the display controller switches the display of the display portion to another screen and causes the another screen to be displayed as a still image if the instruction to switch the display of the display portion to another screen is received by the instruction receiving portion.

According to this invention, the operator can confirm another screen switched from the screen being displayed on the display portion for a longer time by carrying out a simple operation.

In the present invention, the instruction receiving portion receives an instruction to switch the display of the display portion to the first preceding screen as the display switching instruction to switch the display to another screen, and the display controller switches the display of the display portion to the first preceding screen and causes the first preceding screen to be displayed as a still image if the display switching instruction is received by the instruction receiving portion.

According to this invention, the operator can confirm the first preceding screen of the screen being displayed for a long time by carrying out a simple operation.

In the present invention, the instruction receiving portion receives an instruction to switch the display of the display portion to the first screen of the operation procedure as the display switching instruction to switch the display to another screen, and the display controller switches the display of the display portion to the first screen and causes the first screen to be displayed as a still image if the display switching instruction is received by the instruction receiving portion.

According to this invention, the operator can switch to the first screen of the operation procedure and can confirm this first screen for a long time by carrying out a simple operation.

In the present invention, instruction input portion to which an instruction from the operator is inputted in a plurality of operation modes adapted by the operator; and display screen discriminating portion for discriminating an instruction inputted to the instruction input portion and the display screen indicated by this instruction, and in the display controller causes the display portion to display the operation guide by repeatedly reproducing the respective screens constituting the operation procedure at a predetermined speed in rotation, and switches the display of the display portion to the discriminated display screen if the display screen is discriminated by the display screen discriminating portion.

According to this invention, the operator can cause the display portion to display the screen corresponding to each instruction by changing the operation mode adapted at the instruction input portion to input one of a plurality of different instructions corresponding to the respective operation modes. Thus, the operator can immediately switch the display screen to a desired one through a simple operation even without providing many keys.

In the present invention, the display screen discriminating portion discriminates the display screen indicated by the instruction inputted in a predetermined operation mode as the first screen of the operation procedure if the predetermined operation mode is adapted at the instruction input portion by the operator.

According to this invention, the operator can cause the first screen to be immediately displayed on the display portion through a simple operation even without carrying out a complicated operation of judging a timing to input the instruction while looking at the display screen of the display portion.

In the present invention, judging portion for judging whether or not the respective operations guided by the operation guide have been completed by the operator is further provided, and the display screen discriminating portion discriminates the display screen indicated by the instruction inputted in a predetermined operation mode as the screen showing the operation succeeding the one judged to have been completed by the judging portion if the predetermined operation mode is adapted at the instruction input portion by the operator.

According to this invention, the operator can cause the display portion to immediately display the screen showing the operation to be performed next through a simple operation even without carrying out a complicated operation of judging a timing to input the instruction while looking at the display screen of the display portion.

In the present invention, first and second instruction input portions constituting the instruction input portion, and judging portion for judging whether or not the respective operations guided by the operation guide have been completed by the operator are further provided, and the display screen discriminating portion discriminates the display screen indicated by the instruction inputted in a predetermined operation mode as the screen showing the operation succeeding the one judged to have been completed by the judging portion if the predetermined operation mode is adapted at the first instruction input portion by the operator and discriminates the display screen indicated by the instruction inputted in the predetermined operation mode as the first screen of the operation procedure if the predetermined operation mode is adapted at the second instruction input portion by the operator.

According to this invention, the operator can cause the display portion to selectively, easily and immediately display the first screen and the screen showing the operation to be performed next even without carrying out a complicated operation of judging a timing to input the instruction while looking at the display screen of the display portion.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

This application is based on Japanese Patent application serial Nos. 2006-049265, 2006-049266, 2006-049267, 2006-049350 and 2006-049351 filed in Japan Patent Office on Feb. 24, 2006, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus, comprising:
   display portion for displaying an operation guide to an operator; and
   display controller for causing the display portion to display a character explanation of a series of operations to be performed by the operator as the operation guide,
   wherein the display controller causes the display portion to display at one time both a part of the character explanation of the series of operations representing an operation to be performed by the operator at a present moment and other parts of the character explanation of the series of the operations to be performed by the operator, and further causes the part of the character explanation of the operations representing an operation to be performed at the present moment to be displayed in a format different from the other parts of the character explanation, and causes the part of the character explanation of the operations representing an operation to be performed at the present moment to be switched in rotation in response to the series of operations being performed by the operator;
   wherein the display controller further causes the display portion to display an external appearance of the image forming apparatus at the present moment while switching the external appearance of the image forming apparatus in rotation in response to the series of operations as a first display, and causes the display portion to display at one time the first display and the character explanation of the series of operations; and
   wherein the display controller causes the display portion to display a first total total number of the parts of the character explanation of the operations representing the operation to be performed and a second total number of the external appearances of the image forming apparatus to be displayed by switching in rotation in response to the series of operations, the first total number being smaller than the second total number.

2. An image forming apparatus, comprising:
   display portion for displaying an operation guide to an operator; and
   display controller for causing the display portion to display a character explanation of a series of operations to be performed by the operator as the operation guide,
   wherein the display controller causes the display portion to display at one time both a part of the character explanation of the series of operations representing an operation to be performed by the operator at a present moment and other parts of the character explanation of the series of the operations to be performed by the operator, and further causes the part of the character explanation of the operations representing an operation to be performed at the present moment to be displayed in a format different from the other parts of the character explanation, and causes the part of the character explanation of the operations representing an operation to be performed at the present moment to be switched in rotation in response to the series of operations being performed by the operator;

wherein the display controller further causes the display portion to display an external appearance of the image forming apparatus at the present moment while switching the external appearance in rotation in response to the series of operations as a first display, and causes the display portion to display a progress in the operation procedure by causing the display portion to display as a second display the number of the operations constituting the operation procedure and the order number of a specific operation to be performed at the present moment by the operator, and further causes the display portion to display at one time the first display, the second display and the character explanation of the series of operations; and wherein the display controller causes the display portion to display a first total number of the parts of the character explanation of the operations representing the operation to be performed and a second total number of the external appearances of the image forming apparatus to be displayed by switching in rotation in response to the series of operations, the first total number being smaller than the second total number.

\* \* \* \* \*